United States Patent
Tie et al.

(10) Patent No.: US 11,051,278 B2
(45) Date of Patent: Jun. 29, 2021

(54) CONTROL INFORMATION SENDING METHOD, CONTROL INFORMATION DETECTION METHOD, BASE STATION, AND USER EQUIPMENT

(71) Applicant: HUAWEI TECHNOLOGIES CO., LTD., Guangdong (CN)

(72) Inventors: Xiaolei Tie, Shanghai (CN); Yinghui Yu, Beijing (CN); Lei Liu, Shanghai (CN); Steven James Wenham, Cambridge (GB); Odile Rollinger, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/829,431

(22) Filed: Dec. 1, 2017

(65) Prior Publication Data

US 2018/0092082 A1    Mar. 29, 2018

Related U.S. Application Data

(63) Continuation of application No. PCT/CN2015/082129, filed on Jun. 23, 2015.

(51) Int. Cl.
*H04W 72/04* (2009.01)
*H04W 74/08* (2009.01)
(Continued)

(52) U.S. Cl.
CPC ....... *H04W 72/0406* (2013.01); *H04W 72/04* (2013.01); *H04W 72/048* (2013.01);
(Continued)

(58) Field of Classification Search
None
See application file for complete search history.

(56) References Cited

U.S. PATENT DOCUMENTS

| 10,356,682 B2 * | 7/2019 | Fasil Abdul | .......... H04L 1/1896 |
| 2011/0105162 A1 * | 5/2011 | Kim | ....................... H04L 5/0035 |
| | | | 455/500 |

(Continued)

FOREIGN PATENT DOCUMENTS

| CN | 103002477 A | 3/2013 |
| CN | 103327615 A | 9/2013 |

(Continued)

OTHER PUBLICATIONS

Qualcomm Incorporated: "Narrow band OFDMA—Downlink control channel design", 3GPP TSG GERAN 1/2 Ad-Hoc Sophia Antipolis, France, Feb. 2-5, 2015, 6 pages.

(Continued)

*Primary Examiner* — Steve R Young
(74) *Attorney, Agent, or Firm* — Fish & Richardson P.C.

(57) ABSTRACT

Embodiments of the present invention disclose a control information sending method, a control information detection method, a base station, and user equipment. The control information sending method includes: determining, by a base station, target control information and characteristic information corresponding to the target control information, where the target control information is information for scheduling target user equipment by the base station; determining, according to a preset rule and the characteristic information from a resource block set corresponding to a target coverage level, a target resource block subset corresponding to the target control information, and selecting, from the target resource block subset, an available resource block as a target resource block; and sending the target control information using the target resource block.

20 Claims, 13 Drawing Sheets

(51) Int. Cl.
  *H04W 72/12*  (2009.01)
  *H04W 88/02*  (2009.01)
  *H04W 88/08*  (2009.01)

(52) U.S. Cl.
  CPC ....... *H04W 72/12* (2013.01); *H04W 74/0833* (2013.01); *H04W 72/1289* (2013.01); *H04W 88/02* (2013.01); *H04W 88/08* (2013.01); *Y02D 30/70* (2020.08)

(56) References Cited

U.S. PATENT DOCUMENTS

| | | |
|---|---|---|
| 2014/0112285 A1 | 4/2014 | Darwood et al. |
| 2015/0009939 A1 | 1/2015 | Zhang et al. |
| 2015/0016312 A1* | 1/2015 | Li ............................ H04L 5/14 370/280 |
| 2015/0036560 A1* | 2/2015 | Kim ................. H04W 72/0406 370/280 |
| 2015/0249971 A1* | 9/2015 | Yu ......................... H04W 72/04 370/330 |
| 2016/0150570 A1* | 5/2016 | Wang ................ H04W 52/0229 370/329 |
| 2016/0338032 A1* | 11/2016 | Wang ...................... H04W 4/70 |
| 2017/0164340 A1 | 6/2017 | Xu et al. |
| 2018/0109976 A1* | 4/2018 | Ly ........................... H04L 1/005 |

FOREIGN PATENT DOCUMENTS

| | | |
|---|---|---|
| CN | 104184548 A | 12/2014 |
| CN | 104219767 A | 12/2014 |
| CN | 104254135 A | 12/2014 |
| CN | 104365165 A | 2/2015 |
| EP | 2854455 A1 | 4/2015 |
| WO | 2016182689 A1 | 11/2016 |

OTHER PUBLICATIONS

International Search Report and Written Opinion issued in International Application No. PCT/CN2015/082129 dated Mar. 21, 2016; 13 pages.
3rd Generation Partnership Project.;Technical Specification Group GSM/EDGE Radio Access Network; Cellular System Support for Ultra Low Complexity and LowThroughput Internet ofThings(Release 13), 3GPP Standard;3GPP TR 45. 820, 3rd Generation Partnership Project(3GPP), Mobile Competence Centre,ol. Geran WG1, No. V1.3.0, Jun. 5, 2015, XP050966371, 270 pages.
Extended European Search Report in European Application No. 15895903.1 dated May 7, 2018, 9 pages.
Office Action issued in Chinese Application No. 201580053641.6, dated Jul. 1, 2019, 10 pages (With English translation).
EPO Communication pursuant to Article 94(3) EPC issued in European Application No. 15895903.1 dated Oct. 7, 2019, 6 pages.

* cited by examiner

CONTROL INFORMATION SENDING METHOD, CONTROL INFORMATION DETECTION METHOD, BASE STATION, AND USER EQUIPMENT

CROSS-REFERENCE TO RELATED APPLICATIONS

This application is a continuation of International Application No. PCT/CN2015/082129, filed on Jun. 23, 2015, the disclosure of which is hereby incorporated by reference in its entirety.

TECHNICAL FIELD

The present invention relates to the field of communications technologies, and in particular, to a control information sending method, a control information detection method, a base station, and user equipment.

BACKGROUND

Machine type communication (MTC) or the Cellular Internet of Things (CIoT) technology is integration of wireless communications and information technologies, and is used for bidirectional communication and applicable to fields such as security monitoring, a vending machine, cargo tracking, and meter reading. MTC may be classified into three communication modes according to communication objects: machine-to-machine, machine-to-mobile terminal (for example, a user performs remote monitoring), and mobile terminal-to-machine (for example, a user performs remote control). MTC communication will be an important application in the future communications field. In the future, MTC communication may mainly cover intelligent meter reading, medical detection, logistics detection, fire detection, wearable device communication, and the like. It is estimated that a quantity of connected MTC devices will reach 50 billion by 2022.

In a downlink narrowband-based orthogonal frequency division multiplexing (OFDM) technology in the 3rd Generation Partnership Project (3GPP), for resource scheduling, different areas are allocated to physical downlink control channel (PDCCH) resources corresponding to different coverage levels. In addition, different PDCCH resources at different coverage levels are further divided into multiple resource blocks (RS), and each RS is corresponding to scheduling information of one user equipment (UE). Each UE detects an RS on a PDCCH at a corresponding coverage level, to determine whether the UE is scheduled on a subsequent physical downlink shared channel (PDSCH) or physical uplink shared channel (PUSCH). If the UE is scheduled, the UE sends or receives data on an allocated resource.

In the foregoing resource scheduling manner, UE needs to read all RS blocks to detect scheduling information of the UE. In this case, the UE needs relatively large power overheads.

SUMMARY

Embodiments of the present invention provide a control information sending method, a control information detection method, a base station, and user equipment, so as to reduce power overheads required when user equipment detects and receives control information when a base station sends the control information to the user equipment.

A first aspect of the embodiments of the present invention provides a control information sending method, including:

determining, by a base station, target control information and characteristic information corresponding to the target control information, where the target control information is information for scheduling target user equipment by the base station;

determining, by the base station according to a preset rule and the characteristic information from a resource block set corresponding to a target coverage level, a target resource block subset corresponding to the target control information, and selecting, from the target resource block subset, any available resource block as a target resource block, where the target coverage level is a coverage level corresponding to a location at which the target user equipment is located in a coverage area of the base station; and sending, by the base station, the target control information by using the target resource block.

With reference to the first aspect of the embodiments of the present invention, in a first possible implementation of the first aspect of the embodiments of the present invention, the characteristic information corresponding to the target control information is at least one of identification information corresponding to the target control information, time information for sending the target control information, or a message type corresponding to the target control information.

With reference to the first possible implementation of the first aspect of the embodiments of the present invention, in a second possible implementation of the first aspect of the embodiments of the present invention, if the target control information is corresponding to scheduling information of a random access channel RACH acknowledgement message from the base station in response to a target RACH request, the identification information corresponding to the target control information is a random number included in the target RACH request; or if the target control information is corresponding to a paging request message from the base station to the target user equipment, the identification information corresponding to the target control information is an identifier of the target user equipment; or if the target control information is corresponding to uplink data scheduling or downlink data scheduling from the base station to the target user equipment, the identification information corresponding to the target control information is an identifier of the target user equipment.

With reference to the first aspect of the embodiments of the present invention, or the first possible implementation of the first aspect, or the second possible implementation of the first aspect, in a third possible implementation of the first aspect of the embodiments of the present invention, the determining, by the base station according to a preset rule and the characteristic information from a resource block set corresponding to a target coverage level, a target resource block subset corresponding to the target control information includes:

obtaining, by the base station, a quantity N of resource blocks that are readable for the target user equipment;

sorting and numbering, by the base station, resource blocks in the resource block set according to the preset rule; and separately calculating, by the base station, N random values according to preset N random functions and based on the characteristic information corresponding to the target control information, and establishing a correspondence between each random value and one resource block to determine the N resource blocks, to form the target resource block subset corresponding to the target control information.

With reference to the first aspect of the embodiments of the present invention, or the first possible implementation of the first aspect, or the second possible implementation of the first aspect, in a fourth possible implementation of the first aspect of the embodiments of the present invention, the base station includes a first random function set, and the first random function set includes X random functions; and the determining, by the base station according to a preset rule and the characteristic information from a resource block set corresponding to a target coverage level, a target resource block subset corresponding to the target control information includes:

obtaining, by the base station, a quantity X of time units that are readable for the target user equipment; and separately determining, by the base station, multiple resource blocks in the X time units from the resource block set according to the X random functions and based on the characteristic information corresponding to the target control information, to form the target resource block subset corresponding to the target control information.

With reference to the fourth possible implementation of the first aspect of the embodiments of the present invention, in a fifth possible implementation of the first aspect of the embodiments of the present invention, the separately determining, by the base station, multiple resource blocks in the X time units from the resource block set according to the X random functions and based on the characteristic information corresponding to the target control information, to form the target resource block subset corresponding to the target control information includes:

separately calculating, by the base station, X random values according to the preset X random functions and based on the characteristic information corresponding to the target control information, and establishing a correspondence between each random value and one time unit, where all resource blocks in the X time units form the target resource block subset.

With reference to the fourth possible implementation of the first aspect of the embodiments of the present invention, in a sixth possible implementation of the first aspect of the embodiments of the present invention, the base station further includes a second random function set, and the second random function set includes Y random functions; and the separately determining, by the base station, multiple resource blocks in the X time units from the resource block set according to the X random functions and based on the characteristic information corresponding to the target control information, to form the target resource block subset corresponding to the target control information includes:

separately calculating, by the base station, X random values according to the preset X random functions and based on the characteristic information corresponding to the target control information, and establishing a correspondence between each random value and one time unit to determine the X time units; and separately calculating, by the base station, Y random values for a resource block in each of the X time units according to the Y random functions and based on the characteristic information corresponding to the target control information, to determine Y corresponding resource blocks, so as to obtain N resource blocks corresponding to the target control information, to form the target resource block subset corresponding to the target control information, where N=X*Y.

A second aspect of the embodiments of the present invention provides a control information detection method, including:

determining, by user equipment according to a preset rule and preset characteristic information, a target resource block subset from a resource block set corresponding to a current coverage level, where the current coverage level is a coverage level corresponding to a location at which the user equipment is located in a coverage area of a base station;

separately detecting, by the user equipment, resource blocks in the target resource block subset, and if identification information in control information carried in any resource block in the target resource block subset is the same as identification information of the user equipment, determining that the any resource block is a resource block scheduled by the base station for the user equipment; and reading, by the user equipment, the control information carried in the any resource block.

With reference to the second aspect of the embodiments of the present invention, in a first possible implementation of the second aspect of the embodiments of the present invention, the preset characteristic information is at least one of the identification information corresponding to the user equipment or a message type of a message that the user equipment needs to receive.

With reference to the first possible implementation of the second aspect of the embodiments of the present invention, in a second possible implementation of the second aspect of the embodiments of the present invention, if the user equipment sends a RACH request and waits for the base station to feed back a RACH acknowledgement message, the identification information corresponding to the user equipment is a random number included in the RACH request; or if the user equipment waits to receive a paging request message, the identification information corresponding to the user equipment is the identification information of the user equipment; or if the user equipment waits for uplink data scheduling or downlink data scheduling by the base station, the identification information corresponding to the user equipment is the identification information of the user equipment.

With reference to the second aspect of the embodiments of the present invention, or the first possible implementation of the second aspect, or the second implementation of the second aspect, in a third possible implementation of the second aspect of the embodiments of the present invention, the determining, by user equipment according to a preset rule and preset characteristic information, a target resource block subset from a resource block set corresponding to a current coverage level includes:

obtaining, by the user equipment, a quantity N of resource blocks that are readable for the user equipment;

sorting and numbering, by the user equipment, resource blocks in the resource block set according to the preset rule; and separately calculating, by the user equipment, N random values according to preset N random functions and based on the characteristic information corresponding to the user equipment, and establishing a correspondence between each random value and one resource block to determine the N resource blocks, to form the target resource block subset.

With reference to the second aspect of the embodiments of the present invention, or the first possible implementation of the second aspect, or the second implementation of the second aspect, in a fourth possible implementation of the second aspect of the embodiments of the present invention, the user equipment includes a first random function set, and the first random function set includes X random functions; and the determining, by user equipment according to a preset rule and preset characteristic information, a target resource block subset from a resource block set corresponding to a current coverage level includes:

obtaining, by the user equipment, a quantity X of time units that are readable for the user equipment; and separately determining, by the user equipment, multiple resource blocks in the X time units from the resource block set according to the X random functions and based on the preset characteristic information, to form the target resource block subset.

With reference to the fourth implementation of the second aspect of the embodiments of the present invention, in a fifth possible implementation of the second aspect of the embodiments of the present invention, the separately determining, by the user equipment, multiple resource blocks in the X time units from the resource block set according to the X random functions and based on the preset characteristic information, to form the target resource block subset corresponding to the target control information includes:

separately calculating, by the user equipment, X random values according to the preset X random functions and based on the preset characteristic information, and establishing a correspondence between each random value and one time unit, where all resource blocks in the X time units form the target resource block subset.

With reference to the fourth implementation of the second aspect of the embodiments of the present invention, in a sixth possible implementation of the second aspect of the embodiments of the present invention, the user equipment further includes a second random function set, and the second random function set includes Y random functions; and the separately determining, by the user equipment, multiple resource blocks in the X time units from the resource block set according to the X random functions and based on the preset characteristic information, to form the target resource block subset includes:

separately calculating, by the user equipment, X random values according to the preset X random functions and based on the characteristic information corresponding to the user equipment, and establishing a correspondence between each random value and one time unit to determine the X time units; and separately calculating, by the user equipment, Y random values for a resource block in each of the X time units according to the Y random functions and based on the preset characteristic information, to determine Y corresponding resource blocks, so as to obtain N resource blocks corresponding to the target control information, to form the target resource block subset, where $N=X*Y$.

A third aspect of the embodiments of the present invention provides a control information sending method, including:

sorting, by a base station based on all control information that is at a target coverage level and that needs to be sent, the control information according to a preset first-priority sorting rule;

correspondingly allocating, by the base station based on a sorting sequence of the control information and according to a preset sorting sequence of available resource blocks at the target coverage level of the base station, a resource block to the control information that needs to be sent; and sending, by the base station, the corresponding control information based on the allocated resource block.

With reference to the third aspect of the embodiments of the present invention, in a first possible implementation of the third aspect of the embodiments of the present invention, the preset first-priority sorting rule is a preset sorting rule of a random value output from a first random function, and input of the first random function includes characteristic information corresponding to the control information, or the preset first-priority sorting rule is a preset sorting rule of a control information type.

With reference to the first possible implementation of the third aspect of the embodiments of the present invention, in a second possible implementation of the third aspect of the embodiments of the present invention, the available resource blocks at the target coverage level of the base station are sorted according to a time location sequence of the resource blocks; and the correspondingly allocating, by the base station based on a sorting sequence of the control information and according to a preset sorting sequence of available control information resource blocks at the target coverage level of the base station, a control information resource block to the control information block that needs to be sent includes:

sequentially establishing, by the base station, a correspondence between first priorities of all the control information and the available resource blocks based on the first priorities of the control information and time locations in the available resource blocks; and selecting, by the base station for target control information with a same first priority sequence, a resource block from the available resource blocks at the target coverage level of the base station in a time location corresponding to a first priority of the target control information, and allocating the resource block to the target control information.

With reference to the first possible implementation of the third aspect of the embodiments of the present invention, in a third possible implementation of the third aspect of the embodiments of the present invention, the available resource blocks at the target coverage level of the base station are sorted according to the preset resource block sorting rule; and the correspondingly allocating, by the base station based on a sorting sequence of the control information and according to a preset sorting sequence of available resource blocks at the target coverage level of the base station, a resource block to the control information that needs to be sent includes:

starting from the first available resource block, allocating, by the base station to all target control information based on sorting of first priorities of all the control information that needs to be sent, available resource blocks in a one-to-one correspondence with all the target control information.

With reference to the first possible implementation of the third aspect of the embodiments of the present invention, in a fourth possible implementation of the third aspect of the embodiments of the present invention, the available resource blocks at the target coverage level of the base station are grouped every N resource blocks and are sorted according to group numbers of the resource blocks; and the correspondingly allocating, by the base station based on a sorting sequence of the control information and according to a preset sorting sequence of available resource blocks at the target coverage level of the base station, a resource block to the control information block that needs to be sent includes:

sequentially establishing, by the base station, a correspondence between first priorities of all the control information and the available resource blocks based on the first priorities of the control information and the group numbers of the available resource blocks; and in the available resource blocks at the target coverage level of the base station, selecting, by the base station for target control information with a same first priority and from a resource block group corresponding to a group number corresponding to the first priority of the target control information, a resource block to send the target control information.

With reference to the second possible implementation of the third aspect or the fourth possible implementation of the third aspect of the embodiments of the present invention, in a fifth possible implementation of the third aspect of the embodiments of the present invention, when the available resource blocks at the target coverage level of the base station are sorted according to the time location sequence of the resource blocks, the selecting, for target control information with a same first priority sequence, a resource block in a time location corresponding to a first priority of the target control information, and allocating the resource block to the target control information includes:

placing, by the base station, the target control information with a same first priority in a resource block in a corresponding time unit location; and if a quantity of target control information with a same first priority exceeds a quantity of resource blocks in the corresponding time unit location, sequentially placing, by the base station, target control information that is unable to be placed in the corresponding time unit location in a time unit location corresponding to a next first priority; wherein target control information corresponding to the next first priority is placed behind the target control information that is with the first priority and that is unable to be placed in the corresponding time unit location; or when the available resource blocks at the target coverage level of the base station are grouped every N resource blocks and are sorted according to the group numbers of the resource blocks, the selecting, for target control information with a same first priority and from a resource block group corresponding to a group number corresponding to the first priority of the target control information, a resource block to send the target control information includes:

placing, by the base station, the target control information with a same first priority in a resource block with the corresponding group number; and if a quantity of target control information with a same first priority exceeds a quantity of resource blocks in the resource block group corresponding to the corresponding group number, sequentially placing, by the base station, target control information that is unable to be placed in the resource block corresponding to the corresponding group number in a resource block with a group number corresponding to a next first priority; wherein target control information corresponding to the next first priority is placed behind the target control information that is with the first priority and that is unable to be placed in the resource block corresponding to the corresponding group number.

With reference to the first possible implementation of the third aspect of the embodiments of the present invention, in a sixth possible implementation of the third aspect of the embodiments of the present invention, the sorting, by a base station based on all control information that is at a target coverage level and that needs to be sent, the control information according to a first-priority sorting rule further includes:

sorting, by the base station according to a second-priority sorting rule, control information that is with a same first priority and that is in all the control information that needs to be sent.

With reference to the sixth possible implementation of the third aspect of the embodiments of the present invention, in a seventh possible implementation of the third aspect of the embodiments of the present invention, when the first-priority sorting rule is the preset sorting rule of the random value output from the first random function, and the input of the first random function includes the characteristic information corresponding to the control information, the second-priority sorting rule is the preset sorting rule of the control information type; and the sorting, by the base station according to a second-priority sorting rule, control information that is with a same first priority and that is in all the control information that needs to be sent includes:

sorting, by the base station according to the preset sorting rule of the control information type, the control information that is with a same first priority and that is in all the control information that needs to be sent.

With reference to the sixth possible implementation of the third aspect of the embodiments of the present invention, in an eighth possible implementation of the third aspect of the embodiments of the present invention, when the first-priority sorting rule is the preset sorting rule of the control information type, the second-priority sorting rule is for sorting based on an output value of a preset second random function, and input of the second random function includes the characteristic information corresponding to the control information; and the sorting, by the base station according to a second-priority sorting rule, control information that is with a same first priority and that is in all the control information that needs to be sent includes:

calculating, by the base station according to the second random function and the characteristic information corresponding to all the control information that needs to be sent, random values corresponding to all the control information; and sorting, by the base station, all the control information based on the random values corresponding to all the control information.

With reference to the sixth possible implementation of the third aspect of the embodiments of the present invention, or the seventh possible implementation of the third aspect, or the eighth possible implementation of the third aspect, in a ninth possible implementation of the third aspect of the embodiments of the present invention, when the available resource blocks at the target coverage level of the base station are sorted according to a time location sequence of the resource blocks, the selecting, for target control information with a same first priority sequence, a resource block in a time location corresponding to a first priority of the target control information, and allocating the resource block to the target control information includes:

for the target control information with a same first priority, selecting, by the base station, a resource block in a corresponding time unit location according to a second priority of the target control information and according to a preset sequence of resource blocks in a same time unit location, and allocating the resource block to the target control information; or when the available resource blocks at the target coverage level of the base station are grouped every N resource blocks and are sorted according to the group numbers of the resource blocks, the selecting, for target control information with a same first priority and from a resource block group corresponding to a group number corresponding to the first priority of the target control information, a resource block to send the target control information includes:

for the target control information with a same first priority, selecting, by the base station according to a second priority of the target control information and according to a preset sequence in a same resource block group, a resource block from a resource block corresponding to the corresponding group number, and allocate the resource block to the target control information.

With reference to any one of the first possible implementation of the third aspect to the ninth possible implementation of the third aspect of the embodiments of the present invention, in a tenth possible implementation of the third aspect of the embodiments of the present invention, the characteristic information corresponding to the control information is at least one of identification information corresponding to the control information, time information for sending the control information, or a message type corresponding to the control information.

With reference to the tenth possible implementation of the third aspect of the embodiments of the present invention, in an eleventh possible implementation of the third aspect of the embodiments of the present invention, if the target control information is scheduling information of a RACH acknowledgement message from the base station in response to a target RACH request, the identification information corresponding to the target control information is a random number included in the target RACH request; or if the target control information is corresponding to a paging request message from the base station to target user equipment, the identification information corresponding to the target control information is an identifier of the target user equipment; or if the target control information is uplink data scheduling information or downlink data scheduling information from the base station to target user equipment, the identification information corresponding to the target control information is an identifier of the target user equipment.

A fourth aspect of the embodiments of the present invention provides a control information detection method, including:

determining, by user equipment, a first priority of the user equipment according to a preset first-priority sorting rule;

detecting, by the user equipment according to the first priority of the user equipment and according to a preset sorting sequence of available resource blocks of the user equipment, a resource block in the available resource blocks that is scheduled by the base station for the user equipment; and if successfully detecting the resource block in the available resource blocks that is scheduled by the base station for the user equipment, reading, by the user equipment, control information from the resource block that is scheduled by the base station for the user equipment.

With reference to the fourth aspect of the embodiments of the present invention, in a first possible implementation of the fourth aspect of the embodiments of the present invention, the preset first-priority sorting rule is a preset sorting rule of a random value output from a first random function, and input of the first random function includes characteristic information corresponding to the user equipment; and the determining, by user equipment, a first priority of the user equipment according to a preset first-priority sorting rule includes:

calculating, by the user equipment according to the first random function and the characteristic information corresponding to the user equipment, a random value corresponding to the user equipment; and determining, by the user equipment, the first priority of the user equipment based on the random value corresponding to the user equipment and the preset sorting rule of the random value output from the first random function.

With reference to the fourth aspect of the embodiments of the present invention, in a second possible implementation of the fourth aspect of the embodiments of the present invention, the preset first-priority sorting rule is a preset sorting rule of a control information type; and the determining, by user equipment, a first priority of the user equipment according to a preset first-priority sorting rule includes:

determining, by the user equipment, the first priority of the user equipment based on a type of control information that the user equipment needs to receive and according to the preset sorting rule of the control information type.

With reference to the fourth aspect of the embodiments of the present invention, or the first possible implementation of the fourth aspect, or the second possible implementation of the fourth aspect, in a third possible implementation of the fourth aspect of the embodiments of the present invention, the first priority of the user equipment is corresponding to a start reading time location of the available resource blocks of the user equipment; and the detecting, by the user equipment according to the first priority of the user equipment and according to a preset sorting sequence of available resource blocks of the user equipment, a resource block allocated by the base station to the user equipment includes:

determining, by the user equipment according to the first priority of the user equipment, the start reading time location that is of the available resource blocks of the user equipment and that is corresponding to the first priority of the user equipment; and starting from the first resource block in the start reading time location, detecting, by the user equipment according to the preset sorting sequence of the available resource blocks of the user equipment, the resource block allocated by the base station to the user equipment.

With reference to the fourth aspect of the embodiments of the present invention, or the first possible implementation of the fourth aspect, or the second possible implementation of the fourth aspect, in a fourth possible implementation of the fourth aspect of the embodiments of the present invention, the first priority of the user equipment is corresponding to a start reading resource block location of the available resource blocks of the user equipment at a target coverage level; and the detecting, by the user equipment according to the first priority of the user equipment and according to a preset sorting sequence of available resource blocks of the user equipment, a resource block allocated by the base station to the user equipment includes:

determining, by the user equipment according to the first priority of the user equipment, the start reading resource block location that is of the available resource blocks of the user equipment and that is corresponding to the first priority of the user equipment; and starting from the start reading resource block location, detecting, by the user equipment according to the preset sorting sequence of the available resource blocks of the user equipment, the resource block allocated by the base station to the user equipment.

With reference to the third possible implementation of the fourth aspect or the fourth possible implementation of the fourth aspect of the embodiments of the present invention, in a fifth possible implementation of the fourth aspect of the embodiments of the present invention, when detecting the resource block allocated by the base station to the user equipment, the user equipment stops detection if the first priority of the user equipment is lower than a priority of a detected resource block or a resource block used to instruct to stop detection is successfully detected.

With reference to the fourth aspect of the embodiments of the present invention, in a sixth possible implementation of the fourth aspect of the embodiments of the present invention, the user equipment determines a priority of the user equipment according to a preset first-priority rule, and the method further includes:

determining, by the user equipment, a second priority of the user equipment according to a preset second-priority sorting rule.

With reference to the sixth possible implementation of the fourth aspect of the embodiments of the present invention, in a seventh possible implementation of the fourth aspect of the embodiments of the present invention, when the preset first-priority sorting rule is a preset sorting rule of a random value output from a first random function, and input of the first random function includes identification information corresponding to the user equipment, the preset second-priority sorting rule is a preset sorting rule of a control information type; and the determining, by the user equipment, a second priority of the user equipment according to a preset second-priority sorting rule includes:

determining, by the user equipment, the second priority of the user equipment according to the preset sorting rule of the control information type and according to a type of control information that the user equipment needs to receive.

With reference to the sixth possible implementation of the fourth aspect of the embodiments of the present invention, in an eighth possible implementation of the fourth aspect of the embodiments of the present invention, when the preset first-priority sorting rule is a preset sorting rule of a control information type, the preset second-priority sorting rule is a preset sorting rule of a random value output from a second random function, and input of the second random function includes characteristic information corresponding to the user equipment; and the determining, by the user equipment, a second priority of the user equipment according to a preset second-priority sorting rule includes:

calculating, by the user equipment according to the second random function and the characteristic information corresponding to the user equipment, a random value corresponding to the user equipment; and determining, by the user equipment, the second priority of the user equipment based on the random value corresponding to the user equipment and the preset sorting rule of the random value output from the second random function.

With reference to the sixth possible implementation of the fourth aspect of the embodiments of the present invention, or the seventh possible implementation of the fourth aspect, or the eighth possible implementation of the fourth aspect, in a ninth possible implementation of the fourth aspect of the embodiments of the present invention, the first priority of the user equipment is corresponding to a start reading time location of the available resource blocks of the user equipment, and the second priority of the user equipment is corresponding to a start reading resource block in the start reading time location; and the detecting, by the user equipment according to the first priority of the user equipment and according to a preset sorting sequence of available resource blocks of the user equipment, a resource block allocated by the base station to the user equipment includes:

determining, by the user equipment according to the first priority of the user equipment, the start reading time location that is of the available resource blocks of the user equipment and that is corresponding to the first priority of the user equipment;

determining, by the user equipment according to the second priority of the user equipment, a start reading resource block location that is in the start reading time location and that is corresponding to the second priority of the user equipment; and starting from the start reading resource block location in the start reading time location, detecting, by the user equipment according to the preset sorting sequence of the available resource blocks of the user equipment, the resource block allocated by the base station to the user equipment.

With reference to the ninth possible implementation of the fourth aspect of the embodiments of the present invention, in a tenth possible implementation of the fourth aspect of the embodiments of the present invention, when detecting the resource block allocated by the base station to the user equipment, the user equipment stops detection if the second priority of the user equipment is lower than a second priority of a detected resource block or a resource block used to instruct to stop detection is successfully detected.

A fifth aspect of the embodiments of the present invention provides a base station, including:

a processor, configured to determine target control information and characteristic information corresponding to the target control information, where the target control information is information for scheduling target user equipment by the base station; where the processor is further configured to: determine, according to a preset rule and the characteristic information from a resource block set corresponding to a target coverage level, a target resource block subset corresponding to the target control information, and select, from the target resource block subset, any available resource block as a target resource block, where the target coverage level is a coverage level corresponding to a location at which the target user equipment is located in a coverage area of the base station; and a transmitter, configured to send the target control information by using the target resource block.

With reference to the fifth aspect of the embodiments of the present invention, in a first possible implementation of the fifth aspect of the embodiments of the present invention, the characteristic information corresponding to the target control information is at least one of identification information corresponding to the target control information, time information for sending the target control information, or a message type corresponding to the target control information.

With reference to the first possible implementation of the fifth aspect of the embodiments of the present invention, in a second possible implementation of the fifth aspect of the embodiments of the present invention, if the target control information is corresponding to scheduling information of a random access channel RACH acknowledgement message from the base station in response to a target RACH request, the identification information corresponding to the target control information is a random number included in the target RACH request; or if the target control information is corresponding to a paging request message from the base station to the target user equipment, the identification information corresponding to the target control information is an identifier of the target user equipment; or if the target control information is corresponding to uplink data scheduling or downlink data scheduling from the base station to the target user equipment, the identification information corresponding to the target control information is an identifier of the target user equipment.

With reference to the fifth aspect of the embodiments of the present invention, or the first possible implementation of the fifth aspect, or the second possible implementation of the fifth aspect, in a third possible implementation of the fifth aspect of the embodiments of the present invention, the processor is specifically configured to: obtain a quantity N of resource blocks that are readable for the target user equipment; sort and number resource blocks in the resource block set according to the preset rule; and separately calculate N random values according to preset N random functions and based on the characteristic information corresponding to the target control information, and establish a correspondence between each random value and one resource block to determine the N resource blocks, to form the target resource block subset corresponding to the target control information.

With reference to the fifth aspect of the embodiments of the present invention, or the first possible implementation of the fifth aspect, or the second possible implementation of the fifth aspect, in a fourth possible implementation of the fifth aspect of the embodiments of the present invention, the base station includes a first random function set, and the first random function set includes X random functions; and the processor is specifically configured to: obtain a quantity X of time units that are readable for the target user equipment, and separately determine multiple resource blocks in the X time units from the resource block set according to the X random functions and based on the characteristic information corresponding to the target control information, to form the target resource block subset corresponding to the target control information.

With reference to the fourth possible implementation of the fifth aspect of the embodiments of the present invention, in a fifth possible implementation of the fifth aspect of the embodiments of the present invention, the processor is specifically configured to: separately calculate X random values according to the preset X random functions and based on the characteristic information corresponding to the target control information, and establish a correspondence between each random value and one time unit, where all resource blocks in the X time units form the target resource block subset.

With reference to the fourth possible implementation of the fifth aspect of the embodiments of the present invention, in a sixth possible implementation of the fifth aspect of the embodiments of the present invention, the base station further includes a second random function set, and the second random function set includes Y random functions; and the processor is specifically configured to: separately calculate X random values according to the preset X random functions and based on the characteristic information corresponding to the target control information, and establish a correspondence between each random value and one time unit to determine the X time units; and separately calculate Y random values for a resource block in each of the X time units according to the Y random functions and based on the characteristic information corresponding to the target control information, to determine Y corresponding resource blocks, so as to obtain N resource blocks corresponding to the target control information, to form the target resource block subset corresponding to the target control information, where N=X*Y.

A sixth aspect of the embodiments of the present invention provides user equipment, including:

a processor, configured to determine, according to a preset rule and preset characteristic information, a target resource block subset from a resource block set corresponding to a current coverage level, where the current coverage level is a coverage level corresponding to a location at which the user equipment is located in a coverage area of a base station; where the processor is further configured to: separately detect resource blocks in the target resource block subset, and if identification information in control information carried in any resource block in the target resource block subset is the same as identification information of the user equipment, determine that the any resource block is a resource block scheduled by the base station for the user equipment; and the processor is further configured to read the control information carried in the any resource block.

With reference to the sixth aspect of the embodiments of the present invention, in a first possible implementation of the sixth aspect of the embodiments of the present invention, the preset characteristic information is at least one of the identification information corresponding to the user equipment or a message type of a message that the user equipment needs to receive.

With reference to the first possible implementation of the sixth aspect of the embodiments of the present invention, in a second possible implementation of the sixth aspect of the embodiments of the present invention, if the user equipment sends a RACH request and waits for the base station to feed back a RACH acknowledgement message, the identification information corresponding to the user equipment is a random number included in the RACH request; or if the user equipment waits to receive a paging request message, the identification information corresponding to the user equipment is the identification information of the user equipment; or if the user equipment waits for uplink data scheduling or downlink data scheduling by the base station, the identification information corresponding to the user equipment is the identification information of the user equipment.

With reference to the sixth aspect of the embodiments of the present invention, or the first possible implementation of the sixth aspect, or the second possible implementation of the sixth aspect, in a third possible implementation of the sixth aspect of the embodiments of the present invention, the processor is specifically configured to: obtain a quantity N of resource blocks that are readable for the user equipment; sort and number resource blocks in the resource block set according to the preset rule; and separately calculate N random values according to preset N random functions and based on the characteristic information corresponding to the user equipment, and establish a correspondence between each random value and one resource block to determine the N resource blocks, to form the target resource block subset.

With reference to the sixth aspect of the embodiments of the present invention, or the first possible implementation of the sixth aspect, or the second possible implementation of the sixth aspect, in a fourth possible implementation of the sixth aspect of the embodiments of the present invention, the user equipment includes a first random function set, and the first random function set includes X random functions; and the processor is specifically configured to: obtain a quantity X of time units that are readable for the user equipment, and separately determine multiple resource blocks in the X time units from the resource block set according to the X random functions and based on the preset characteristic information, to form the target resource block subset.

With reference to the fourth possible implementation of the sixth aspect of the embodiments of the present invention, in a fifth possible implementation of the sixth aspect of the embodiments of the present invention, the processor is specifically configured to: separately calculate X random values according to the preset X random functions and based on the preset characteristic information, and establish a correspondence between each random value and one time unit, where all resource blocks in the X time units form the target resource block subset.

With reference to the fourth possible implementation of the sixth aspect of the embodiments of the present invention, in a sixth possible implementation of the sixth aspect of the embodiments of the present invention, the user equipment further includes a second random function set, and the second random function set includes Y random functions; and the processor is specifically configured to: separately calculate X random values according to the preset X random functions and based on the characteristic information corresponding to the user equipment, and establish a correspondence between each random value and one time unit to determine the X time units; and separately calculate Y random values for a resource block in each of the X time units according to the Y random functions and based on the preset characteristic information, to determine Y corresponding resource blocks, so as to obtain N resource blocks corresponding to the target control information, to form the target resource block subset, where $N=X*Y$.

A seventh aspect of the embodiments of the present invention provides a base station, including:

a processor, configured to sort, based on all control information that is at a target coverage level and that needs to be sent, the control information according to a preset first-priority sorting rule; where the processor is further configured to correspondingly allocate, based on a sorting sequence of the control information and according to a preset sorting sequence of available resource blocks at the target coverage level of the base station, a resource block to the control information that needs to be sent; and a transmitter, configured to send the corresponding control information based on the resource block allocated by the processor.

With reference to the seventh aspect of the embodiments of the present invention, in a first possible implementation of the seventh aspect of the embodiments of the present invention, the preset first-priority sorting rule is a preset sorting rule of a random value output from a first random function, and input of the first random function includes characteristic information corresponding to the control information, or the preset first-priority sorting rule is a preset sorting rule of a control information type.

With reference to the first possible implementation of the seventh aspect of the embodiments of the present invention, in a second possible implementation of the seventh aspect of the embodiments of the present invention, the available resource blocks at the target coverage level of the base station are sorted according to a time location sequence of the resource blocks; and the processor is specifically configured to: sequentially establish a correspondence between first priorities of all the control information and the available resource blocks based on the first priorities of the control information and time locations in the available resource blocks; and for target control information with a same first priority sequence, select a resource block from the available resource blocks at the target coverage level of the base station in a time location corresponding to a first priority of the target control information, and allocate the resource block to the target control information.

With reference to the first possible implementation of the seventh aspect of the embodiments of the present invention, in a third possible implementation of the seventh aspect of the embodiments of the present invention, the available resource blocks at the target coverage level of the base station are sorted according to the preset resource block sorting rule; and the processor is specifically configured to: starting from the first available resource block, allocate, to all target control information based on sorting of first priorities of all the control information that needs to be sent, available resource blocks in a one-to-one correspondence with all the target control information.

With reference to the first possible implementation of the seventh aspect of the embodiments of the present invention, in a fourth possible implementation of the seventh aspect of the embodiments of the present invention, the available resource blocks at the target coverage level of the base station are grouped every N resource blocks and are sorted according to group numbers of the resource blocks; and the processor is specifically configured to: sequentially establish a correspondence between first priorities of all the control information and the available resource blocks based on the first priorities of the control information and the group numbers of the available resource blocks; and in the available resource blocks at the target coverage level of the base station, for target control information with a same first priority, select, from a resource block group corresponding to a group number corresponding to the first priority of the target control information, a resource block to send the target control information.

With reference to the second possible implementation of the seventh aspect or the fourth possible implementation of the seventh aspect of the embodiments of the present invention, in a fifth possible implementation of the seventh aspect of the embodiments of the present invention, when the available resource blocks at the target coverage level of the base station are sorted according to the time location sequence of the resource blocks, the processor is specifically configured to: place the target control information with a same first priority in a resource block in a corresponding time unit location; and if a quantity of target control information with a same first priority exceeds a quantity of resource blocks in the corresponding time unit location, sequentially place target control information that is unable to be placed in the corresponding time unit location in a time unit location corresponding to a next first priority, where target control information corresponding to the next first priority is placed behind the target control information that is with the first priority and that is unable to be placed in the corresponding time unit location; or when the available resource blocks at the target coverage level of the base station are grouped every N resource blocks and are sorted according to the group numbers of the resource blocks, the processor is specifically configured to: place the target control information with a same first priority in a resource block with the corresponding group number; and if a quantity of target control information with a same first priority exceeds a quantity of resource blocks in the resource block group corresponding to the corresponding group number, sequentially place target control information that is unable to be placed in the resource block corresponding to the corresponding group number in a resource block with a group number corresponding to a next first priority, where target control information corresponding to the next first priority is placed behind the target control information that is with the first priority and that is unable to be placed in the resource block corresponding to the corresponding group number.

With reference to the first possible implementation of the seventh aspect of the embodiments of the present invention, in a sixth possible implementation of the seventh aspect of the embodiments of the present invention, the processor is specifically configured to sort, according to a second-priority sorting rule, control information that is with a same first priority and that is in all the control information that needs to be sent.

With reference to the sixth possible implementation of the seventh aspect of the embodiments of the present invention, in a seventh possible implementation of the seventh aspect of the embodiments of the present invention, when the first-priority sorting rule is the preset sorting rule of the random value output from the first random function, and the input of the first random function includes the characteristic information corresponding to the control information, the second-priority sorting rule is the preset sorting rule of the control information type; and the processor is specifically configured to sort, according to the preset sorting rule of the control information type, the control information that is with a same first priority and that is in all the control information that needs to be sent.

With reference to the sixth possible implementation of the seventh aspect of the embodiments of the present invention, in an eighth possible implementation of the seventh aspect of the embodiments of the present invention, when the first-priority sorting rule is the preset sorting rule of the control information type, the second-priority sorting rule is for sorting based on an output value of a preset second random function, and input of the second random function includes the characteristic information corresponding to the control information; and the processor is specifically configured to: calculate, according to the second random function and the characteristic information corresponding to all the control information that needs to be sent, random values corresponding to all the control information, and sort all the control information based on the random values corresponding to all the control information.

With reference to the sixth possible implementation of the seventh aspect of the embodiments of the present invention, or the seventh possible implementation of the seventh aspect, or the eighth possible implementation of the seventh aspect, in a ninth possible implementation of the seventh aspect of the embodiments of the present invention, when the available resource blocks at the target coverage level of the base station are sorted according to a time location sequence of the resource blocks, the processor is specifically configured to: for target control information with a same first priority, select a resource block in a corresponding time unit location according to a second priority of the target control information and according to a preset sequence of resource blocks in a same time unit location, and allocate the resource block to the target control information; or when the available resource blocks at the target coverage level of the base station are grouped every N resource blocks and are sorted according to group numbers of the resource blocks, the processor is specifically configured to: for target control information with a same first priority, select, according to a second priority of the target control information and according to a preset sequence in a same resource block group, a resource block from a resource block corresponding to a corresponding group number, and allocate the resource block to the target control information.

An eighth aspect of the embodiments of the present invention provides user equipment, including:

a processor, configured to: determine a first priority of the user equipment according to a preset first-priority sorting rule; detect, according to the first priority of the user equipment and according to a preset sorting sequence of available resource blocks of the user equipment, a resource block in the available resource blocks that is scheduled by the base station for the user equipment; and if successfully detecting the resource block in the available resource blocks that is scheduled by the base station for the user equipment, read control information from the resource block that is scheduled by the base station for the user equipment.

With reference to the eighth aspect of the embodiments of the present invention, in a first possible implementation of the eighth aspect of the embodiments of the present invention, the preset first-priority sorting rule is a preset sorting rule of a random value output from a first random function, and input of the first random function includes characteristic information corresponding to the user equipment; and the processor is specifically configured to: calculate, according to the first random function and the characteristic information corresponding to the user equipment, a random value corresponding to the user equipment; and determine the first priority of the user equipment based on the random value corresponding to the user equipment and the preset sorting rule of the random value output from the first random function.

With reference to the eighth aspect of the embodiments of the present invention, in a second possible implementation of the eighth aspect of the embodiments of the present invention, the preset first-priority sorting rule is a preset sorting rule of a control information type; and the processor is specifically configured to determine the first priority of the user equipment based on a type of control information that the user equipment needs to receive and according to the preset sorting rule of the control information type.

With reference to the eighth aspect of the embodiments of the present invention, or the first possible implementation of the eighth aspect, or the second possible implementation of the eighth aspect, in a third possible implementation of the eighth aspect of the embodiments of the present invention, the first priority of the user equipment is corresponding to a start reading time location of the available resource blocks of the user equipment; and the processor is specifically configured to: determine, according to the first priority of the user equipment, the start reading time location that is of the available resource blocks of the user equipment and that is corresponding to the first priority of the user equipment; and starting from the first resource block in the start reading time location, detect, according to the preset sorting sequence of the available resource blocks of the user equipment, the resource block allocated by the base station to the user equipment.

With reference to the eighth aspect of the embodiments of the present invention, or the first possible implementation of the eighth aspect, or the second possible implementation of the eighth aspect, in a fourth possible implementation of the eighth aspect of the embodiments of the present invention, the first priority of the user equipment is corresponding to a start reading resource block location of the available resource blocks of the user equipment at a target coverage level; and the processor is specifically configured to: determine, according to the first priority of the user equipment, the start reading resource block location that is of the available resource blocks of the user equipment and that is corresponding to the first priority of the user equipment; and starting from the start reading resource block location, detect, according to the preset sorting sequence of the available resource blocks of the user equipment, the resource block allocated by the base station to the user equipment.

With reference to the second possible implementation of the eighth aspect or the third possible implementation of the eighth aspect of the embodiments of the present invention, in a fourth possible implementation of the eighth aspect of the embodiments of the present invention, the processor is further specifically configured to: when detecting the resource block allocated by the base station to the user equipment, stop detection if the first priority of the user equipment is lower than a priority of a detected resource block or a resource block used to instruct to stop detection is successfully detected.

With reference to the eighth aspect of the embodiments of the present invention, in a fifth possible implementation of the eighth aspect of the embodiments of the present invention, the processor is further specifically configured to determine a second priority of the user equipment according to a preset second-priority sorting rule.

With reference to the fifth possible implementation of the eighth aspect of the embodiments of the present invention, in a sixth possible implementation of the eighth aspect of the embodiments of the present invention, when the preset first-priority sorting rule is a preset sorting rule of a random value output from a first random function, and input of the first random function includes identification information corresponding to the user equipment, the preset second-priority sorting rule is a preset sorting rule of a control information type; and the processor is specifically configured to determine the second priority of the user equipment according to the preset sorting rule of the control information type and according to a type of control information that the user equipment needs to receive.

With reference to the fifth possible implementation of the eighth aspect of the embodiments of the present invention, in a seventh possible implementation of the eighth aspect of the embodiments of the present invention, when the preset first-priority sorting rule is a preset sorting rule of a control information type, the preset second-priority sorting rule is a preset sorting rule of a random value output from a second random function, and input of the second random function includes characteristic information corresponding to the user equipment; and the processor is specifically configured to: calculate, according to the second random function and the characteristic information corresponding to the user equipment, a random value corresponding to the user equipment; and determine the second priority of the user equipment based on the random value corresponding to the user equipment and the preset sorting rule of the random value output from the second random function.

With reference to the fifth possible implementation of the eighth aspect of the embodiments of the present invention, or the sixth possible implementation of the eighth aspect, or the seventh possible implementation of the eighth aspect, in an eighth possible implementation of the eighth aspect of the embodiments of the present invention, the first priority of the user equipment is corresponding to a start reading time location of the available resource blocks of the user equipment, and the second priority of the user equipment is corresponding to a start reading resource block in the start reading time location; and the processor is specifically configured to: determine, according to the first priority of the user equipment, the start reading time location that is of the available resource blocks of the user equipment and that is corresponding to the first priority of the user equipment; determine, according to the second priority of the user equipment, a start reading resource block location that is in the start reading time location and that is corresponding to the second priority of the user equipment; and starting from the start reading resource block location in the start reading time location, detect, according to the preset sorting sequence of the available resource blocks of the user equipment, the resource block allocated by the base station to the user equipment.

It may be learned from the foregoing technical solutions that the embodiments of the present invention have the following advantages:

In the embodiments of the present invention, a base station selects, for target control information according to a specific rule, a resource block from all resource blocks corresponding to a target coverage level, so that user equipment detects a resource block scheduled by the base station for the user equipment, to read the target control information. In this process, the user equipment does not need to blindly detect all the resource blocks. This reduces power overheads of UE when resource scheduling is performed on the UE.

BRIEF DESCRIPTION OF DRAWINGS

FIG. 4-1 is a schematic diagram of a specific embodiment of the embodiment in FIG. 4;

FIG. 4-2 is a schematic diagram of another specific embodiment of the embodiment in FIG. 4;

FIG. 6-1 is a schematic diagram of a specific embodiment of the embodiment in FIG. 6;

FIG. 6-2 is a schematic diagram of another specific embodiment of the embodiment in FIG. 6;

FIG. 6-3 is a schematic diagram of another specific embodiment of the embodiment in FIG. 6;

FIG. 6-4 is a schematic diagram of another specific embodiment of the embodiment in FIG. 6;

DESCRIPTION OF EMBODIMENTS

Figure 1:
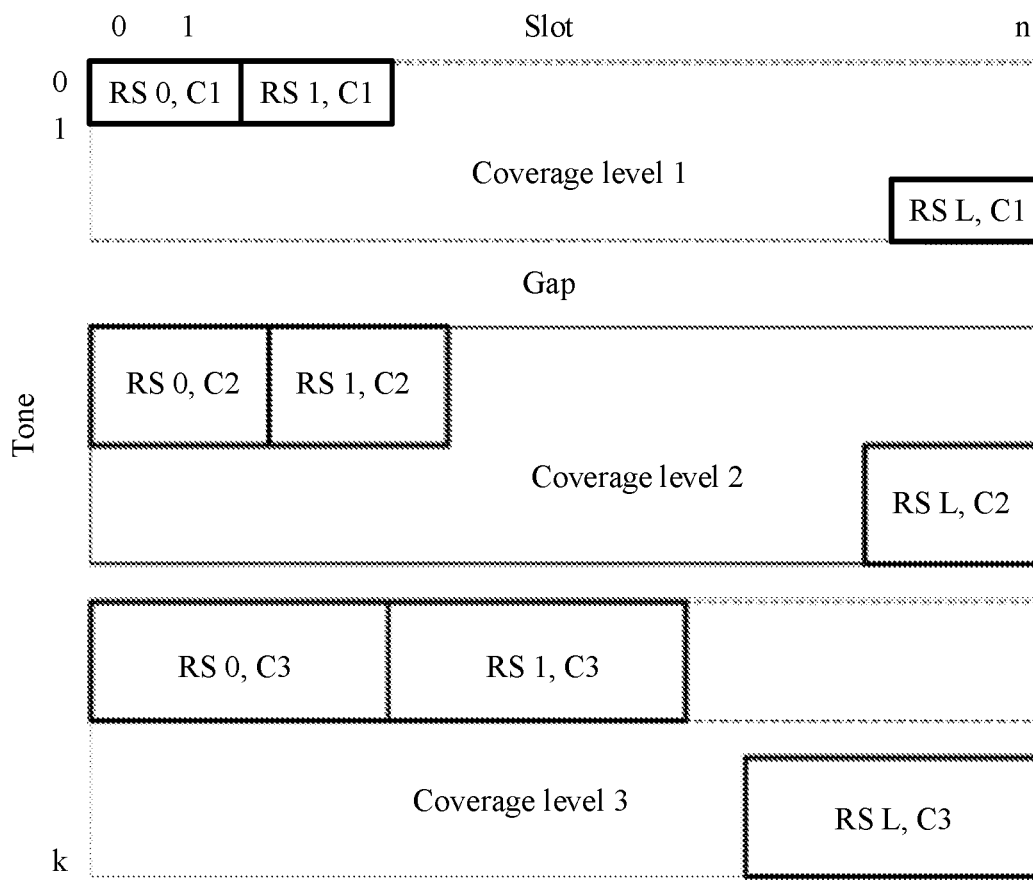
FIG. 1 is a schematic diagram of control information sending in the prior art.

The embodiments of the present invention provide a control information sending method, a control information detection method, a base station, and user equipment, so as to reduce power overheads required when user equipment detects and receives control information when a base station sends the control information to the user equipment.

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", and the like (if they exist) are intended to distinguish between similar objects but do not necessarily indicate a specific order. It should be understood that data termed in such a way is interchangeable in proper circumstances so that the embodiments of the present invention described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those units, but may include other units not expressly listed or inherent to such a process, method, system, product, or device.

To easily understand the embodiments of the present invention, some elements used in descriptions of the embodiments of the present invention are first described herein.

Downlink control information (DCI) is carried on a physical downlink control channel (PDCCH). Downlink control information sent by a base station to UE includes uplink-downlink resource allocation, hybrid automatic repeat request (HARQ) information, power control, and the like.

An International Mobile Subscriber Identity (IMSI) is an identifier for distinguishing between mobile users, is stored in a SIM card, and may be used as valid information for distinguishing between the mobile users. The IMSI identity is a permanent identifier of user equipment.

A temporary logical link identifier (TLLI) includes 4 bytes, that is, 32 bits. A core network allocates a TLLI identifier to user equipment.

A radio network temporary identifier (RNTI) is used as an identifier of UE in signal information between the UE and a base station. Multiple types of RNTIs are classified according to different functions. Each UE may be corresponding to multiple RNTIs. Functions such as system broadcast and scheduling for a particular user are implemented by indexing or scrambling a PDCCH control message by using the RNTI. The RNTI includes a cell radio network temporary identifier (C-RNTI) used to schedule a resource for UE in an air-interface connected state, a paging radio network temporary identifier (P-RNTI) used by UE in a paging process, and the like. The P-RNTI identifier is generated according to a TLLI identifier or an IMSI identity of user equipment by using a predetermined rule.

OFDM (Orthogonal Frequency Division Multiplexing) is an orthogonal frequency division multiplexing technology. OFDM is one of multi-carrier modulation MCM (Multi Carrier Modulation). A main idea of OFDM is as follows: A channel is divided into multiple orthogonal sub-channels, a high-speed data signal is converted into parallel low-speed sub-data streams, and the parallel low-speed sub-data streams are modulated to the sub-channels for transmission. Orthogonal signals may be separated at a receive end by using a related technology. In this way, mutual interference between sub-channels can be reduced. Signal bandwidth on each sub-channel is less than related bandwidth of a channel. Therefore, flat fading may occur on each sub-channel, so that intersymbol interference can be cancelled. In addition, because bandwidth on each sub-channel is only a small part of bandwidth of an original channel, channel equalization becomes relatively easy.

Control information described in the embodiments of the present invention includes but is not limited to scheduling information. The present invention may be used for Internet of Things communication (Cellular Internet of Things CIoT or Machine Type Communication MTC).

A type of the control information includes but is not limited to scheduling information for a random access channel RACH (Random Access Channel) acknowledgement message of a target RACH request, a paging request message of target user equipment, scheduling information for a paging request message of target user equipment, and scheduling information corresponding to uplink data scheduling or downlink data scheduling from a base station to target user equipment.

Identification information of the control information includes but is not limited to the following cases:

if the target control information is corresponding to scheduling information of a RACH acknowledgement message from the base station in response to a target RACH request, the identification information corresponding to the target control information is a random number included in the target RACH request; or if the target control information is corresponding to a paging request message from a base station to target user equipment, the identification information corresponding to the target control information is an identifier of the target user equipment; or if the target control information is corresponding to uplink data scheduling or downlink data scheduling from a base station to target user equipment, the identification information corresponding to the target control information is an identifier of the target user equipment.

The identification information of the user equipment includes but is not limited to an IMSI identity, a TLLI identifier, and an RNTI identifier.

Due to special requirements of MTC communication, there are mainly the following requirements for a network and UE:

Low power consumption: Low power consumption of UE is required. Lower power consumption means that MTC UE has a longer standby time, so as to reduce labor costs for changing a battery.

Large coverage requirement: An MTC service generally does not need an extremely high service rate, but needs to be able to support extremely large coverage. This specifically means that an MTC base station needs to have a relatively strong coverage enhancement technology, and can provide a communication service to user equipment with a relatively large penetration loss (20 dB). For example, user equipment such as an intelligent water/electricity meter in an intelligent meter reading service is generally installed indoors or even in a basement, and it is difficult to provide a reliable communication service to devices at these locations by using an existing cellular network technology.

Large connection quantity: One MTC base station may be connected to a large quantity (more than tens of thousands) of user equipments, for example, widely deployed Internet of Things terminal devices such as intelligent water/electricity meters, smart home devices, cars, and wearable devices. Therefore, how to provide a connection service to multiple user equipments at a same moment and avoid network congestion is a problem that needs to be resolved.

Cost-effectiveness: Costs of UE need to be lower than those of existing UE. A necessary condition for massive deployment of MTC devices is cost-effectiveness.

Currently, in 3GPP, in an OFDM-based downlink narrowband Internet of Things system, control information sending, that is, scheduling information sending is shown in FIG. 1. A channel for sending control information in a downlink direction is a physical downlink control channel (PDCCH). In a time-frequency block grid, time-frequency block resources of the PDCCH are divided into different areas corresponding to different coverage levels (such as a class 0, a class 1, and a class 2 in FIG. 1). In addition, different PDCCH resources at different coverage levels are further divided into multiple resource blocks (Resource Segmentation (RS) or Resource Block (RB)) or PDCCH message (PDCCH message) resource blocks. Each RS or PDCCH message resource block is corresponding to one data unit protected by a CRC, corresponding to control information (scheduling information) of one user equipment (UE), corresponding to control information (scheduling information) of one RACH response, or corresponding to one piece of paging signaling or one group of paging signaling. Table 1 below is examples of resources occupied by a PDCCH message at a physical layer and formats of the PDCCH message at the physical layer.

TABLE 1

| Coverage level | No. of tones | No. of slots | Coding rate | Modulation | Total No. of Tones | Total No. of Messages per frame | Tx power/tone (dBm) |
| --- | --- | --- | --- | --- | --- | --- | --- |
| 5 | 6 | 24 | 1/24 | BPSK | −18 | 3 | 27 |
| 4 | 4 | 12 | 1/8 | BPSK | 16 | 8 | 24 |
| 3 | 2 | 6 | 1/2 | BPSK | 16 | 32 | 23 |
| 2 | 2 | 2 | 3/4 | QPSK | 14 | 84 | 23 |
| 1 | 2 | 1 | 1/2 | 16QAM | 2 | 24 | 21 |

In an existing mechanism, for each PDCCH message, an example of control information carried in each PDCCH message resource block is shown in Table 2 below. It may be seen that each resource block includes a UE ID (such as a TLLI identifier or a TMSI identifier in addressing) and a resource indication (such as information in PDSCH subcarrier allocation and PDSCH slot allocation) corresponding to the UE ID. After receiving a corresponding PDCCH message resource block, UE obtains control information carried in the PDCCH message, and sends uplink data or receives downlink data on a corresponding resource according to the control information.

TABLE 2

| Information Element | Size (bits) | Purpose |
| --- | --- | --- |
| Message ID | 5 | |
| Addressing | 32/40 | TLLI/S-TMSI |
| PDSCH subcarrier allocation | 5 | First tone of the downlink resource segment. |
| PDSCH slot allocation | 8 | First slot of the downlink resource segment |
| Relative Starting FN | 2 | Frame offset from the frame number on which the device received the downlink assignment message to where the downlink resource allocation starts |
| Coding scheme | 5 | |
| PUCCH slot for sending ack/nack | 2 | Relative slot number for sending ack/nack.<br>00: Unack mode used, no PUCCH allocated<br>01: 1 slot after last of PDSCH block.<br>10: 2 slot after last slot of PDSCH block.<br>11: 3 slot after last slot of PDSCH block. |
| Number of consecutive data segments to receive | 3 | Number of consecutive data segments (1 to 8) that the device can receive before MS needs to receive new downlink assignment |

Another example of control information that is carried in a PDCCH message and is corresponding to a RACH response is shown in Table 3. A random number (Access request reference field) is a random number included in a corresponding RACH request packet. The random number is identification information of the control information corresponding to the RACH response.

TABLE 3

| Information Element | Purpose |
| --- | --- |
| Message ID | Identifies message |
| Address with request reference | |
| Access request reference | Random number in the channel request sent to request uplink resources. |
| PRACH resource ID | This identifies the RACH resource block where the channel request was received. |
| TLLI/S-TMSI | |
| PUSCH Sub-carrier allocation | First sub-carrier of the uplink resource segment |
| PUSCH slot allocation | First slot of the uplink resource segment |
| Relative Starting FN | Frame offset from the frame number in which the device received the Uplink assignment message to where the resource allocation starts.<br>00 same FN<br>01 1 Fame after assignment message frame number<br>10 2 Frames after assignment message frame number<br>11 3 Frames after assignment message frame number |
| Timing advance | |
| Coding scheme | |
| C-RNTI | C-RNTI value to assign to MS |

A PDCCH is used to carry downlink control information (DCI) that includes uplink/downlink scheduling information and uplink power control information.

Generally, an MTC terminal may obtain a PDCCH message or DCI by demodulating a PDCCH channel in each subframe, so as to obtain control information carried in the PDCCH message or the DCI. The control information indicates resource indication information, modulation and coding scheme information, or the like of a physical downlink shared channel (PDSCH), or resource allocation information, modulation and coding scheme information, or the like of a physical uplink shared channel (PUSCH), so that the user equipment demodulates downlink data or sends uplink data according to content of the control information.

A PDCCH is required to instruct to schedule a PDSCH. That is, UE can receive the PDSCH only after correctly receiving the PDCCH. Specifically, each UE reads a resource block on a PDCCH at a corresponding coverage level, and checks whether identification information of control information carried in the read resource block matches identification information (such as a TLLI identifier or a TMSI identifier) of the UE, to determine whether the read resource block is sent to the UE. If it is found that a read resource block is sent to the UE, the UE parses control information carried in the resource block, and reads a subsequent PDSCH resource or sends uplink data on a PUSCH resource according to the control information. If the UE successfully detects no resource block sent to the UE, the UE is not scheduled.

In the foregoing resource scheduling manner, UE needs to read all control information resource blocks to find control information of the UE or determine that the UE is not scheduled. In this case, the UE needs relatively large power overheads.

Figure 2:
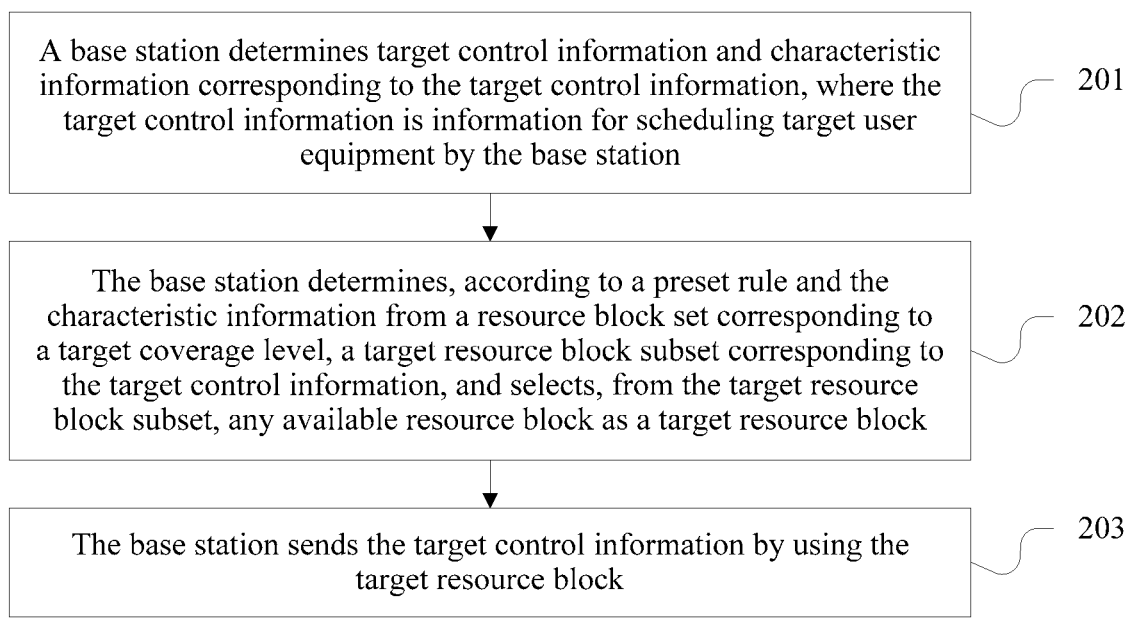
FIG. 2 is a schematic diagram of an embodiment of a control information sending method according to the embodiments of the present invention.

Based on the foregoing reason, embodiments of the present invention provide a control information sending method, a control information detection method, a base station, and user equipment. The following first describes an embodiment of a scheduling method in machine type communication in the embodiments of the present invention. Referring to FIG. 2, a control information sending method provided in an embodiment of the present invention may include the following content:

201. A base station determines target control information and characteristic information corresponding to the target control information, where the target control information is information for scheduling target user equipment by the base station.

When scheduling user equipment, the base station generates control information for scheduling the user equipment. The control information has some corresponding characteristic information, for example, identification information corresponding to the control information, time information for sending the control information, and a message type corresponding to the control information. The base station may determine the target control information and the characteristic information corresponding to the target control information.

202. The base station determines, according to a preset rule and the characteristic information from a resource block set corresponding to a target coverage level, a target resource block subset corresponding to the target control information, and selects, from the target resource block subset, any available resource block as a target resource block.

The target coverage level is a coverage level corresponding to the target control information, that is, a coverage level of the target user equipment corresponding to the target control information. Generally, the base station may learn of a coverage level of user equipment by using a preamble resource or a preamble sequence sent by the user equipment in a random access process or a RACH resource occupied by the user equipment in a random access process. For user equipment in a connected state, the base station also knows a coverage level of the user equipment. For user equipment, a coverage level may be preconfigured, or may be determined according to a measurement value of a signal sent by the base station.

The target resource block subset corresponding to the target control information is a subset in all resource block sets corresponding to the target coverage level. Optionally, a quantity A of elements in all resource blocks corresponding to the target coverage level and a quantity B of elements in the target resource block subset meet A>B.

The target control information may include identification information of the target user equipment. After determining the target resource block subset, the base station selects any available resource block from the target resource block subset to send the target control information. For example, the selected resource block does not conflict with another resource block at the target coverage level, that is, the resource block is not selected as a resource block for sending other control information.

Optionally, the characteristic information corresponding to the target control information is at least one of identification information corresponding to the target control information, time information for sending the target control information, or a message type corresponding to the target control information.

Optionally, if the target control information is corresponding to scheduling information of a random access channel RACH acknowledgement message from the base station in response to a target RACH request, the identification information corresponding to the target control information is a random number included in the target RACH request; or if the target control information is corresponding to a paging request message from the base station to the target user equipment, the identification information corresponding to the target control information is an identifier of the target user equipment; or if the target control information is corresponding to uplink data scheduling or downlink data scheduling from the base station to the target user equipment, the identification information corresponding to the target control information is an identifier of the target user equipment.

203. The base station sends the target control information by using the target resource block.

In this embodiment of the present invention, a base station first determines a target resource block subset from a resource block set corresponding to a target coverage level, and selects a resource block from the target resource block subset to send target control information, so that user equipment also determines a target resource block subset, and detects, in the target resource block subset, a resource block scheduled by the base station for the user equipment. In this process, the user equipment does not need to blindly detect all resource blocks, but needs to detect only resource blocks in the target resource block subset. This reduces power overheads of UE when resource scheduling is performed on the UE.

In the embodiment shown in FIG. 1, there are multiple implementations of determining, by the base station according to the preset rule and the characteristic information from the resource block set corresponding to the target coverage level, the target resource block subset corresponding to the target control information. The following provides detailed descriptions by using examples.

1. That the base station determines, according to a preset rule and the characteristic information from a resource block set corresponding to a target coverage level, a target resource block subset corresponding to the target control information includes: obtaining, by the base station, a quantity N of resource blocks that are readable for the target user equipment; sorting and numbering, by the base station, resource blocks in the resource block set according to the preset rule; and separately calculating, by the base station, N random values according to preset N random functions and based on the characteristic information corresponding to the target control information, and establishing a correspondence between each random value and one resource block to determine the N resource blocks, to form the target resource block subset corresponding to the target control information.

Figure 3:
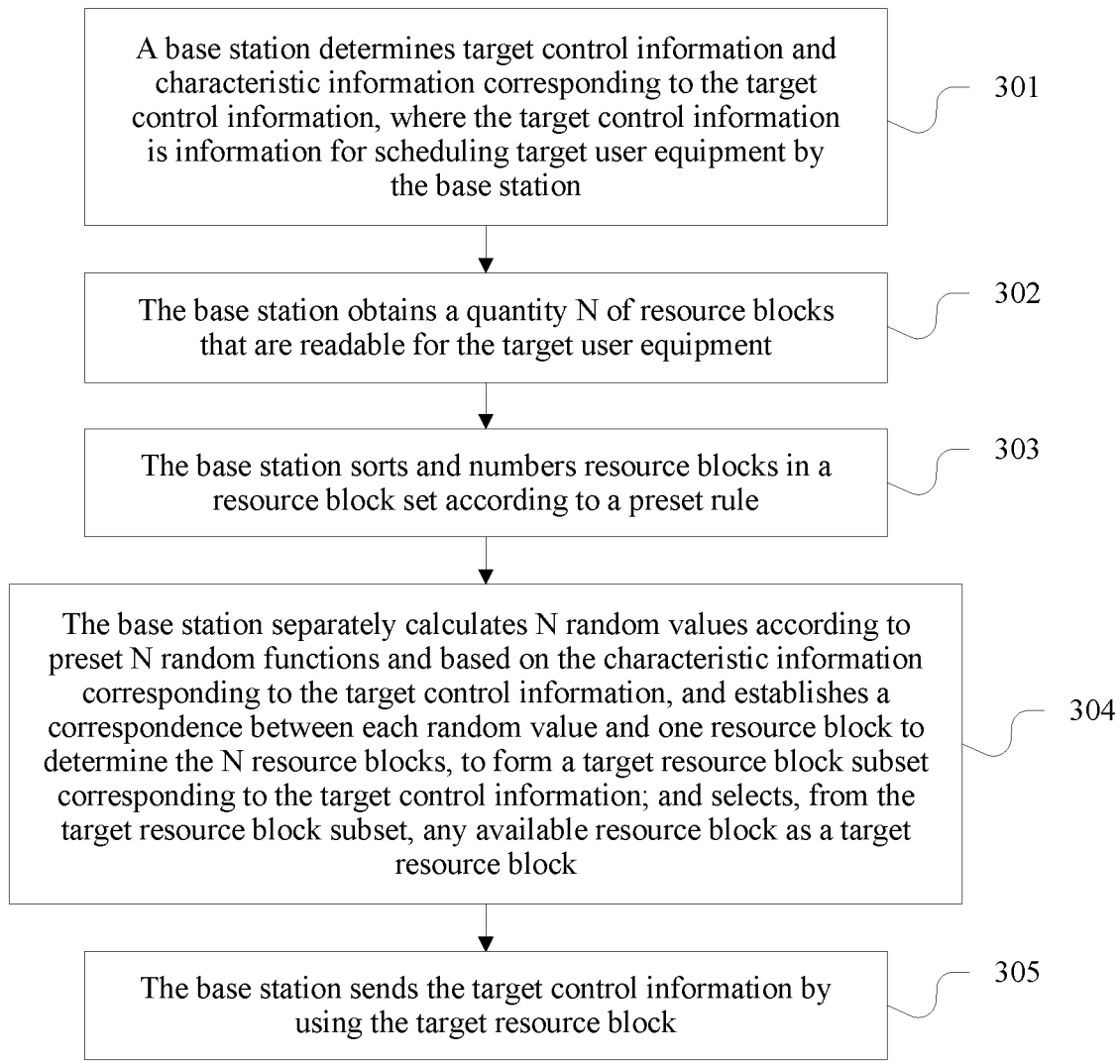
FIG. 3 is a schematic diagram of another embodiment of a control information sending method according to the embodiments of the present invention.

Referring to FIG. 3, another embodiment of a control information sending method provided in the embodiments of the present invention may include the following content:

301. A base station determines target control information and characteristic information corresponding to the target control information, where the target control information is information for scheduling target user equipment by the base station.

This step is similar to step 201, and details are not described herein again.

302. The base station obtains a quantity N of resource blocks that are readable for the target user equipment.

Generally, because user equipment has limited power consumption, the user equipment can read a limited quantity of resource blocks. Therefore, the base station may determine, according to a power consumption capability of the user equipment, a quantity N of resource blocks that are readable for the user equipment, and notify the user equipment by using broadcast information. Alternatively, the base station and the user equipment may preset a quantity N of resource blocks that are readable for the user equipment.

303. The base station sorts and numbers resource blocks in the resource block set according to a preset rule.

The base station sorts and numbers, according to the preset rule, resource blocks in a resource block set corresponding to the target coverage level. The base station may perform sorting and numbering in various manners, for example, according to a time location, a time unit, or a resource block sequence. This is not limited herein.

304. The base station separately calculates N random values according to preset N random functions and based on the characteristic information corresponding to the target control information, and establishes a correspondence between each random value and one resource block to determine the N resource blocks, to form a target resource block subset corresponding to the target control information; and selects, from the target resource block subset, any available resource block as a target resource block.

A quantity of resource blocks that are readable for the target user equipment corresponding to the target control information is N, that is, the target user equipment can read only N resource blocks. Therefore, correspondingly, the N random functions are preset in this step. The base station determines the N resource blocks according to the preset N random functions, to form the target resource block subset corresponding to the target control information. The preset N random functions may have a preset sequence. The N random values are separately and sequentially calculated according to the specified sequence and based on the characteristic information corresponding to the target control information. The correspondence between each random value and one resource block is established, to determine the N resource blocks.

The random function in this embodiment may be a SHA-1, a message digest algorithm (including an MD2, an MD3, an MD4, and an MD5), or the like in hash functions.

305. The base station sends the target control information by using the target resource block.

The target control information may include identification information of the target user equipment. After determining the target resource block subset, the base station selects any available resource block from the target resource block subset to send the target control information. For example, the selected resource block does not conflict with another resource block at the target coverage level, that is, according to a preset scheduling algorithm of the base station, the resource block is not selected as a resource block for sending other control information.

2. The base station includes a first random function set, and the first random function set includes X random functions.

That the base station determines, according to a preset rule and the characteristic information from a resource block set corresponding to a target coverage level, a target resource block subset corresponding to the target control information includes: obtaining, by the base station, a quantity X of time units that are readable for the target user equipment; and separately determining, by the base station, multiple resource blocks in the X time units from the resource block set according to the X random functions and based on the characteristic information corresponding to the target control information, to form the target resource block subset corresponding to the target control information.

Figure 4:
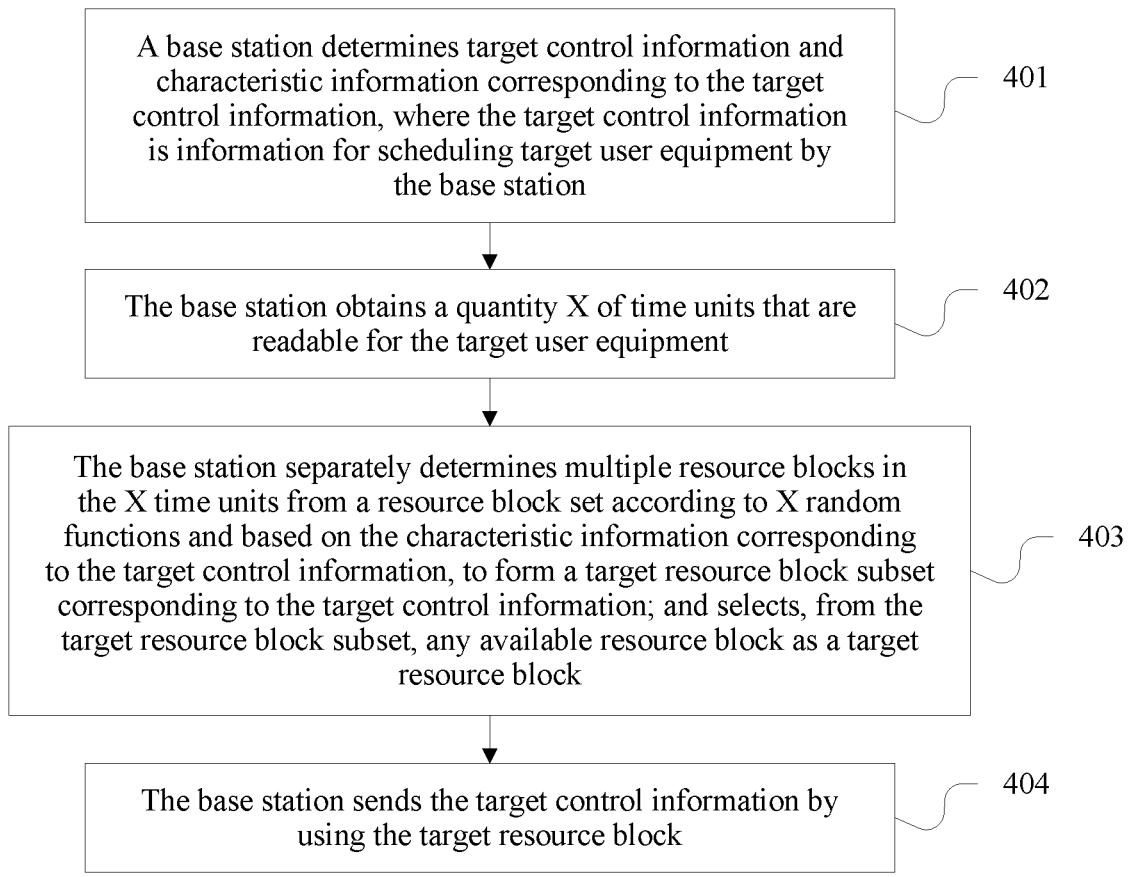
FIG. 4 is a schematic diagram of another embodiment of a control information sending method according to the embodiments of the present invention.
Figures 1, 4:
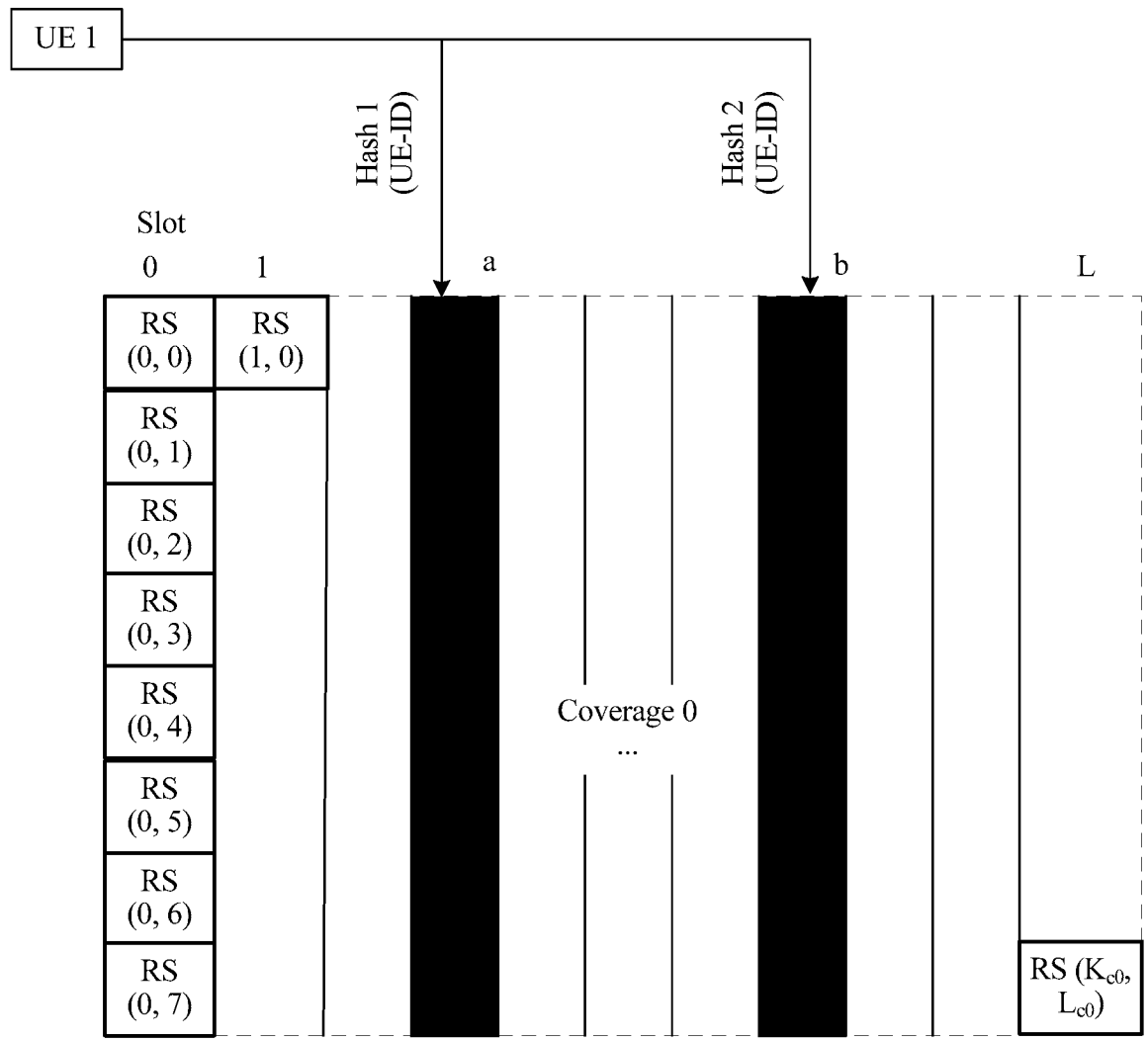
Figures 2, 4:
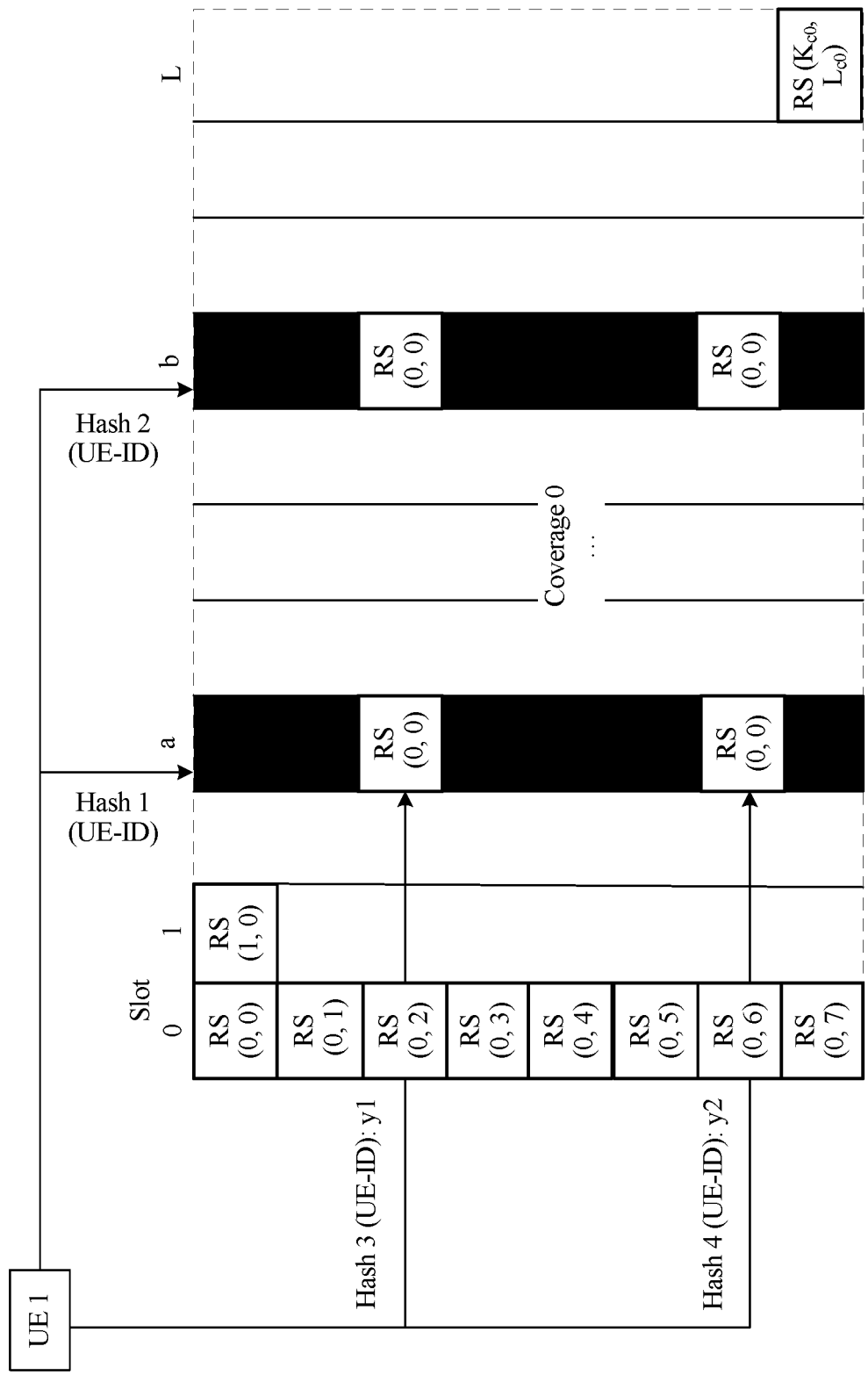

Referring to FIG. 4, another embodiment of a control information sending method provided in the embodiments of the present invention may include the following content:

401. A base station determines target control information and characteristic information corresponding to the target control information, where the target control information is information for scheduling target user equipment by the base station.

This step is similar to step 201, and details are not described herein again.

402. The base station obtains a quantity X of time units that are readable for the target user equipment.

Generally, because user equipment has limited power consumption, the user equipment can read a limited quantity of time units. Therefore, the base station may determine, according to a capability of the user equipment, a quantity X of time units that are readable for the user equipment, and notify the user equipment by using broadcast information. Alternatively, the base station and the user equipment may agree on, in advance, a quantity X of time units that are readable for the user equipment.

403. The base station separately determines multiple resource blocks in the X time units from the resource block set according to the X random functions and based on the characteristic information corresponding to the target control information, to form a target resource block subset corresponding to the target control information; and selects, from the target resource block subset, any available resource block as a target resource block.

In this embodiment, the base station includes a first random function set, and the first random function set includes the X random functions. The quantity of time units that are readable for the target user equipment corresponding to the target control information is X, that is, the target user equipment can read only X time units. Therefore, correspondingly, in this step, the base station determines the multiple resource blocks in the X time units according to the X random functions, to form the target resource block subset corresponding to the target control information. Optionally, the X random functions may have a specified sequence.

The time unit is a time length corresponding to a resource block (Resource Segmentation) corresponding to control information at the coverage level. For example, if each resource block RS at a coverage level 0 occupies a time of four subcarriers*one slot, for the coverage level 0, one time unit is one time location slot. If each resource block RS corresponding to a coverage level 1 occupies a time of four subcarriers*three slots, for the coverage level 1, each time unit is three slots.

Optionally, that the base station separately determines multiple resource blocks in the X time units from the resource block set according to the X random functions and based on the characteristic information corresponding to the target control information, to form a target resource block subset corresponding to the target control information includes:

separately calculating, by the base station, X random values according to the preset X random functions and based on the characteristic information corresponding to the target control information, and establishing a correspondence between each random value and one time unit, where all resource blocks in the X time units form the target resource block subset.

For example, as shown in FIG. 4-1, it is assumed that target user equipment UE 1 is at a coverage level 0, a quantity X of time units that are readable for the UE 1 is 2, the first random function set includes two hash functions: hash 1 and hash 2, the hash 1 ranks higher than the hash 2, and the characteristic information corresponding to the target control information is an ID of the target user equipment (that is, UE-ID, such as a TLLI identifier, an IMSI identity, or a C-RNTI). A random value a corresponding to the ID of the target user equipment is calculated by using the hash 1, and the random value a is corresponding to a time location slot a of all resource blocks corresponding to the target coverage level. A random value b corresponding to the ID of the target user equipment is calculated by using the hash 2, and the random value b is corresponding to a time location slot b of all the resource blocks corresponding to the target coverage level. All resource blocks in the slot a and the slot b form the target resource block subset.

Optionally, for determining the X time units, the base station further includes a second random function set, and the second random function set includes Y random functions.

That the base station separately determines multiple resource blocks in the X time units from the resource block set according to the X random functions and based on the characteristic information corresponding to the target control information, to form the target resource block subset corresponding to the target control information includes:

separately calculating, by the base station, X random values according to the preset X random functions and based on the characteristic information corresponding to the target control information, and establishing a correspondence between each random value and one time unit to determine the X time units; and separately calculating, by the base station, Y random values for a resource block in each of the X time units according to the Y random functions and based on the characteristic information corresponding to the target control information, to determine Y corresponding resource blocks, so as to obtain N resource blocks corresponding to the target control information, to form the target resource block subset corresponding to the target control information, where N=X*Y.

For example, as shown in FIG. 4-2, on the basis of FIG. 4-1, the preset set of functions may further include the second random function set, the second random function set includes two functions: hash 3 and hash 4, and the hash 3 ranks higher than the hash 4. On the basis of the slot a and the slot b that are calculated above, the target resource block subset that includes all the resource blocks in the slot a and the slot b is not directly obtained herein. Instead, a random value y1 corresponding to the ID of the target user equipment is further calculated by using the hash 3, and $(y1)^{th}$ resource blocks separately in the slot a and the slot b are found. A random value y2 corresponding to the ID of the target user equipment is calculated by using the hash 4, and $(y2)^{th}$ resource blocks separately in the slot a and the slot b are found. In this case, a $(y1)^{th}$ resource block in the slot a, a $(y1)^{th}$ resource block in the slot b, a $(y2)^{th}$ resource block in the slot a, and a $(y2)^{th}$ resource block in the slot b form the target resource block subset. Further, for the second random function, if a time unit is also used as a parameter, random values obtained in the slot a by using the functions hash 3 and hash 4 may be different from those obtained in the slot b by using the functions hash 3 and hash 4.

404. The base station sends the target control information by using the target resource block.

The target control information may include characteristic information of the target user equipment. After determining the target resource block subset, the base station selects any available resource block from the target resource block subset to send the target control information. For example, the selected resource block does not conflict with another resource block at the target coverage level, that is, the base station schedules a resource block that is not selected as a resource block for sending other control information.

Figure 5:
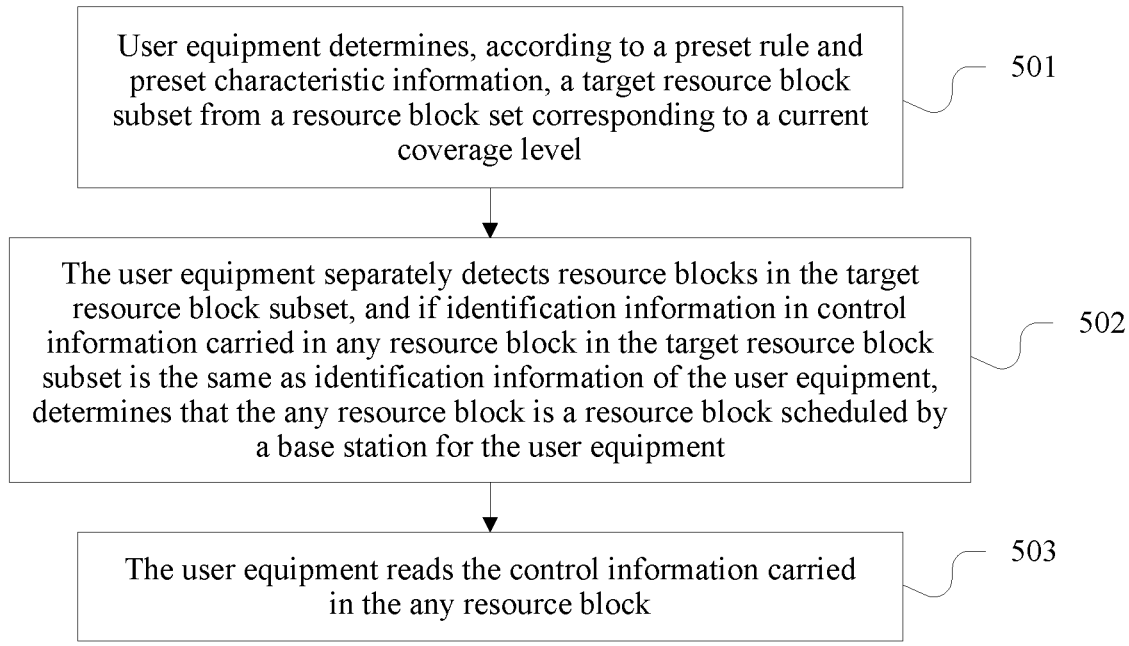
FIG. 5 is a schematic diagram of an embodiment of a control information detection method according to the embodiments of the present invention.

The following describes an embodiment of a method for detecting corresponding control information in FIG. 2 to FIG. 4. Referring to FIG. 5, an embodiment of a control information detection method provided in the embodiments of the present invention may include the following content:

501. User equipment determines, according to a preset rule and preset characteristic information, a target resource block subset from a resource block set corresponding to a current coverage level.

The current coverage level is a coverage level corresponding to a location at which the user equipment is located in a coverage area of a base station. Generally, the user equipment may notify the base station of a coverage level of the user equipment by using a preamble resource or a preamble sequence sent in a random access process or a RACH resource occupied by the user equipment in a random access process. For user equipment in a connected state, the base station also knows a coverage level of the user equipment. For user equipment, a coverage level may be preconfigured, or may be determined according to a measurement value of a signal sent by the base station.

502. The user equipment separately detects resource blocks in the target resource block subset, and if identification information in control information carried in any resource block in the target resource block subset is the same as identification information of the user equipment, determines that the any resource block is a resource block scheduled by the base station for the user equipment.

503. The user equipment reads the control information carried in the any resource block.

For example, if identification information in control information carried in a first resource block in the target resource block subset is the same as the identification information of the user equipment, it is determined that the first resource block is the resource block scheduled by the base station for the user equipment. The user equipment reads the control information carried in the first resource block.

In this embodiment of the present invention, user equipment first determines a target resource block subset from all resource blocks corresponding to a target coverage level, and detects, in the target resource block subset, whether a resource block in the target resource block subset is a resource block scheduled by a base station for the user equipment. In this process, the user equipment does not need to read all the resource blocks, but needs to detect only resource blocks in the target resource block subset. This reduces power overheads of UE when resource scheduling is performed on the UE.

Optionally, the user equipment determines, according to the preset rule and the preset characteristic information, the target resource block subset from the resource block set corresponding to the current coverage level.

Optionally, if the user equipment sends a RACH request and waits for the base station to feed back a RACH acknowledgement message, the identification information corresponding to the user equipment is a random number included in the RACH request; or if the user equipment waits to receive a paging request message, the identification information corresponding to the user equipment is the identification information of the user equipment; or if the user equipment waits for uplink data scheduling or downlink data scheduling by the base station, the identification information corresponding to the user equipment is the identification information of the user equipment.

Optionally, that user equipment determines, according to a preset rule and preset characteristic information, a target resource block subset from a resource block set corresponding to a current coverage level includes:

obtaining, by the user equipment, a quantity N of resource blocks that are readable for the user equipment;

sorting and numbering, by the user equipment, resource blocks in the resource block set according to the preset rule; and separately calculating, by the user equipment, N random values according to preset N random functions and based on the characteristic information corresponding to the user equipment, and establishing a correspondence between each random value and one resource block to determine the N resource blocks, to form the target resource block subset.

Optionally, referring to FIG. 4-1, the user equipment includes a first random function set, and the first random function set includes X random functions.

That user equipment determines, according to a preset rule and preset characteristic information, a target resource block subset from a resource block set corresponding to a current coverage level includes:

obtaining, by the user equipment, a quantity X of time units that are readable for the user equipment; and separately determining, by the user equipment, multiple resource blocks in the X time units from the resource block set according to the X random functions and based on the preset characteristic information, to form the target resource block subset.

Optionally, referring to FIG. 4-2, the separately determining, by the user equipment, multiple resource blocks in the X time units from the resource block set according to the X random functions and based on the preset characteristic information, to form the target resource block subset corresponding to the target control information includes:

separately calculating, by the user equipment, X random values according to the preset X random functions and based on the preset characteristic information, and establishing a correspondence between each random value and one time unit, where all resource blocks in the X time units form the target resource block subset.

In the foregoing embodiment, when resource scheduling is performed on UE, power overheads of the UE are reduced based on a manner in which a target resource block is determined. The following describes an embodiment in which power overheads of UE are reduced based on a sorting relationship when resource scheduling is performed on the UE.

Figure 6:
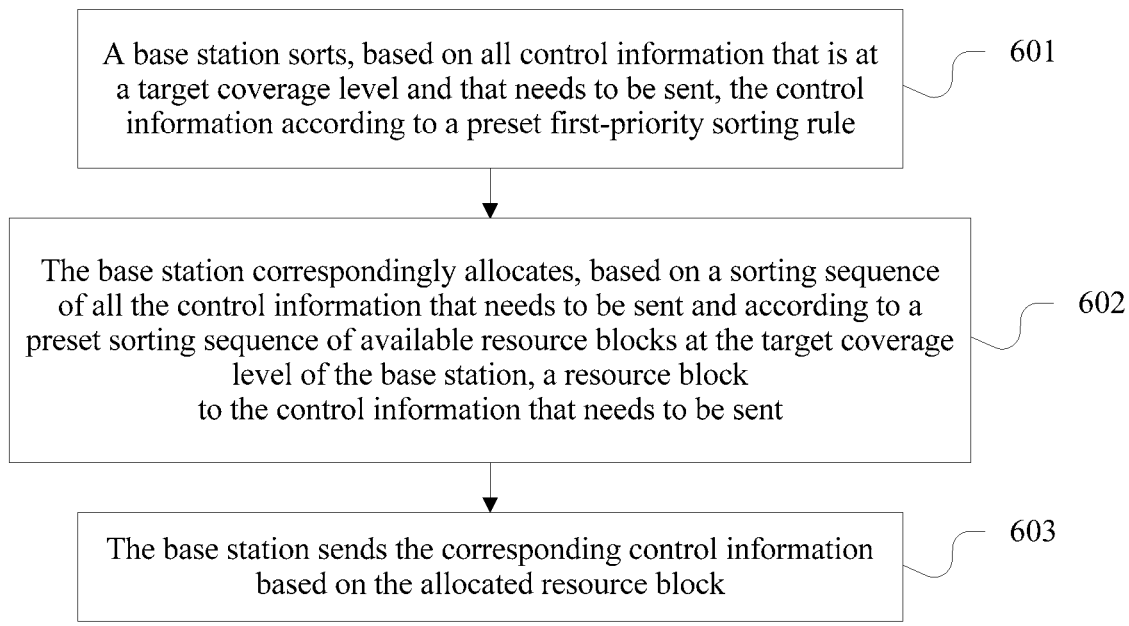
FIG. 6 is a schematic diagram of another embodiment of a control information sending method according to the embodiments of the present invention.
Figures 1, 6:
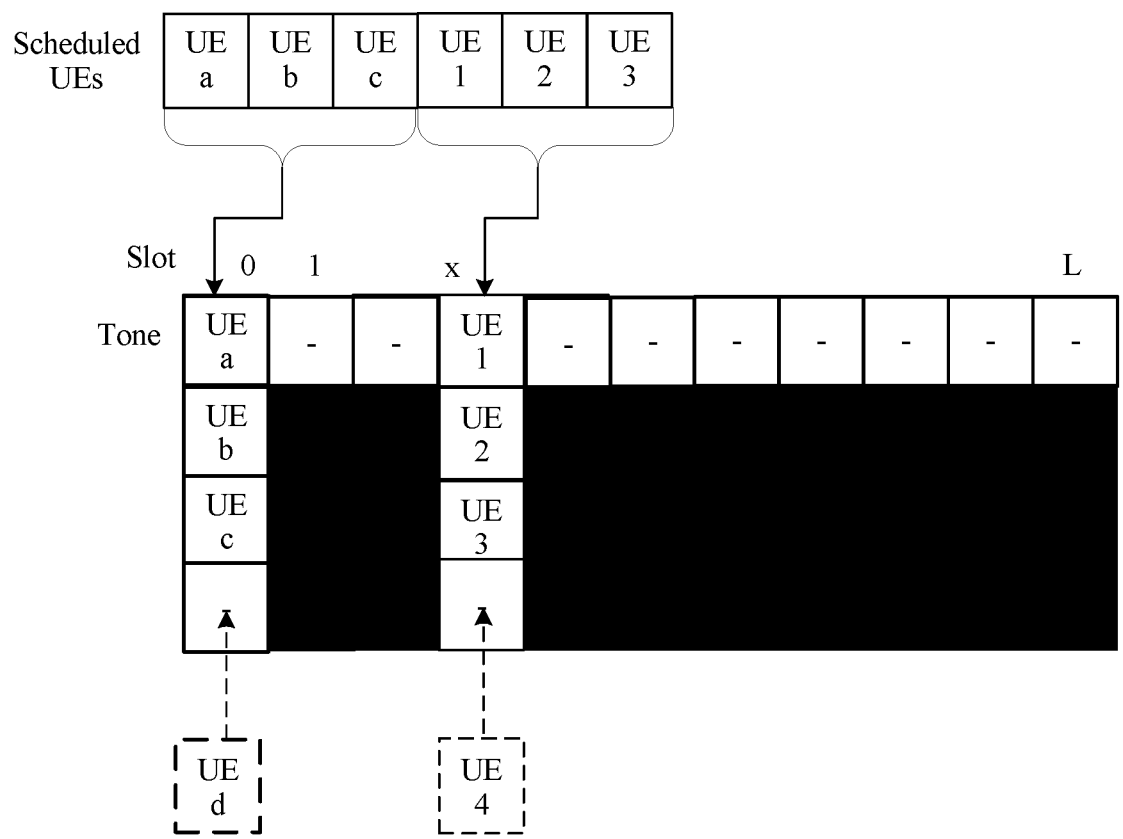
Figures 2, 6:
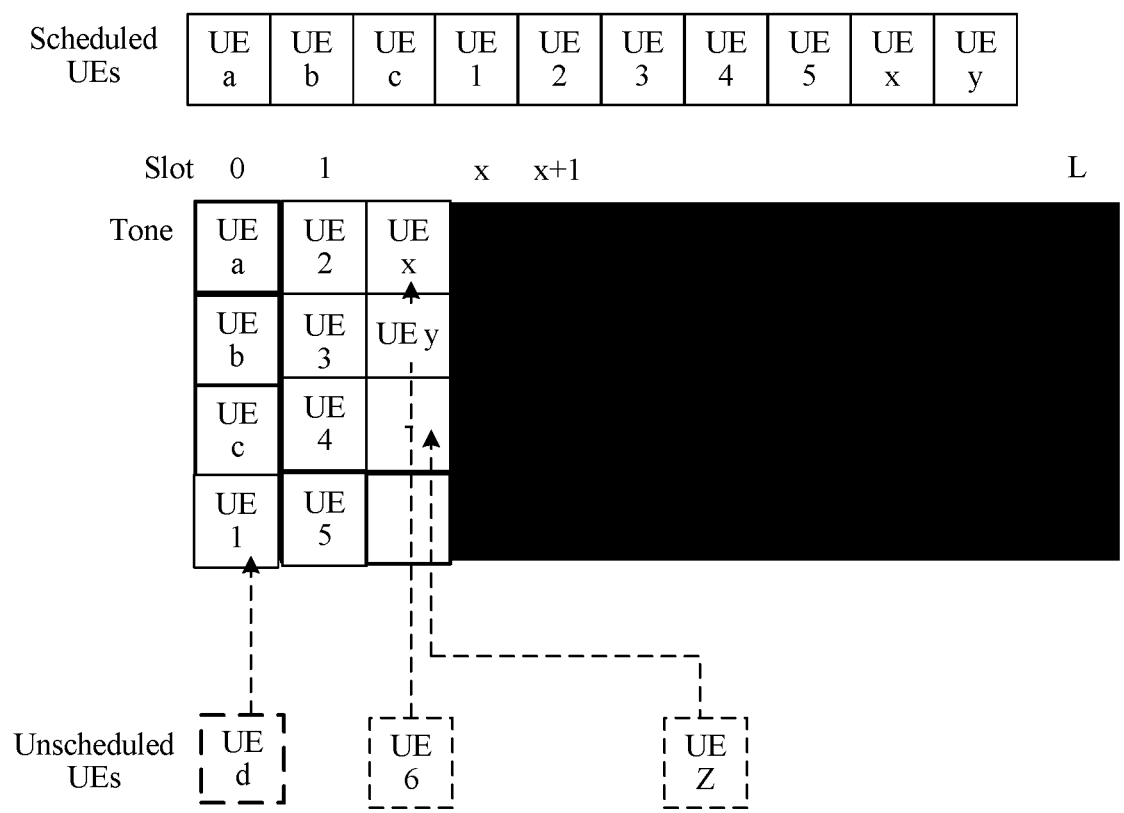
Figures 3, 6:
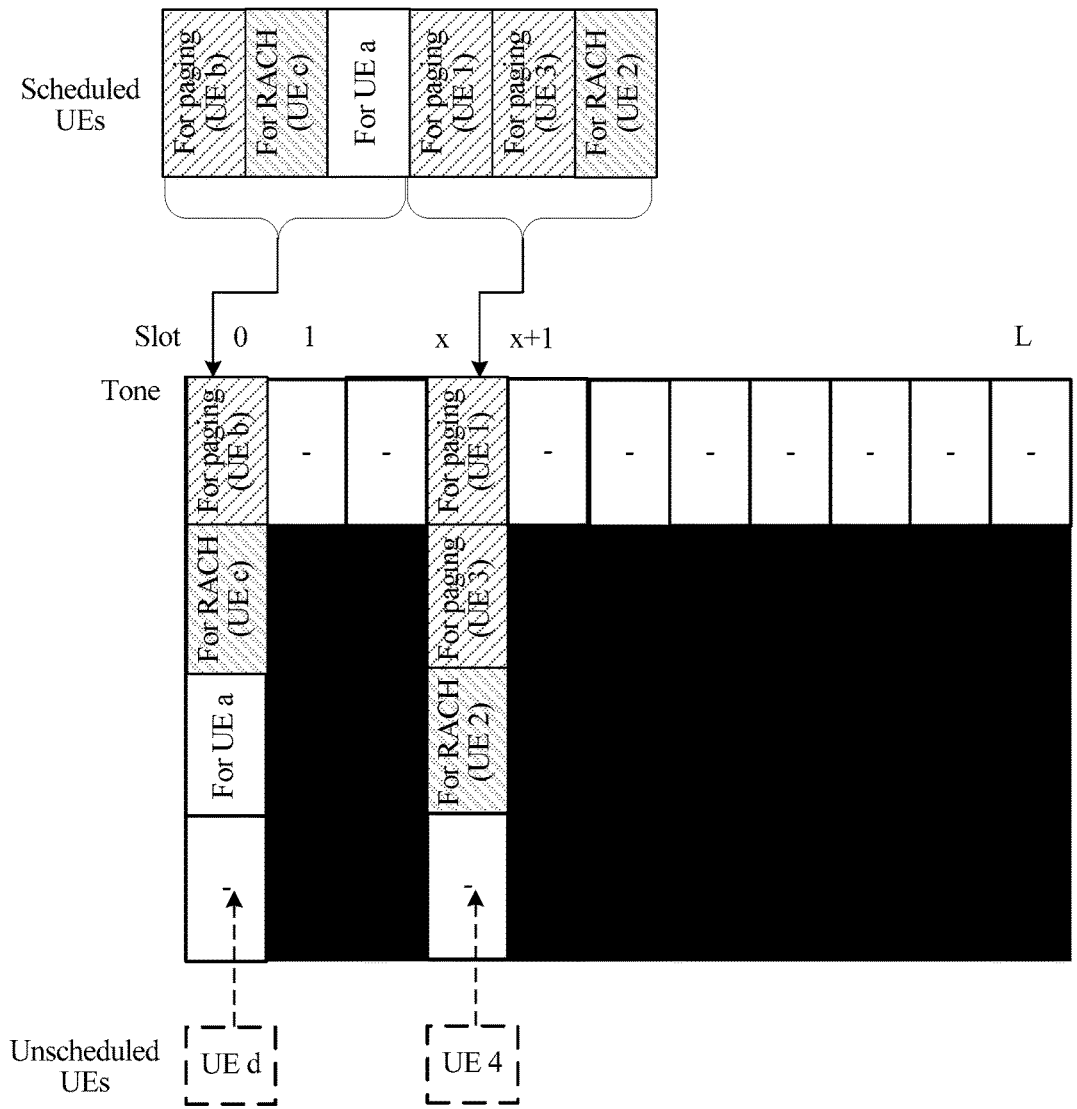
Figures 4, 6:
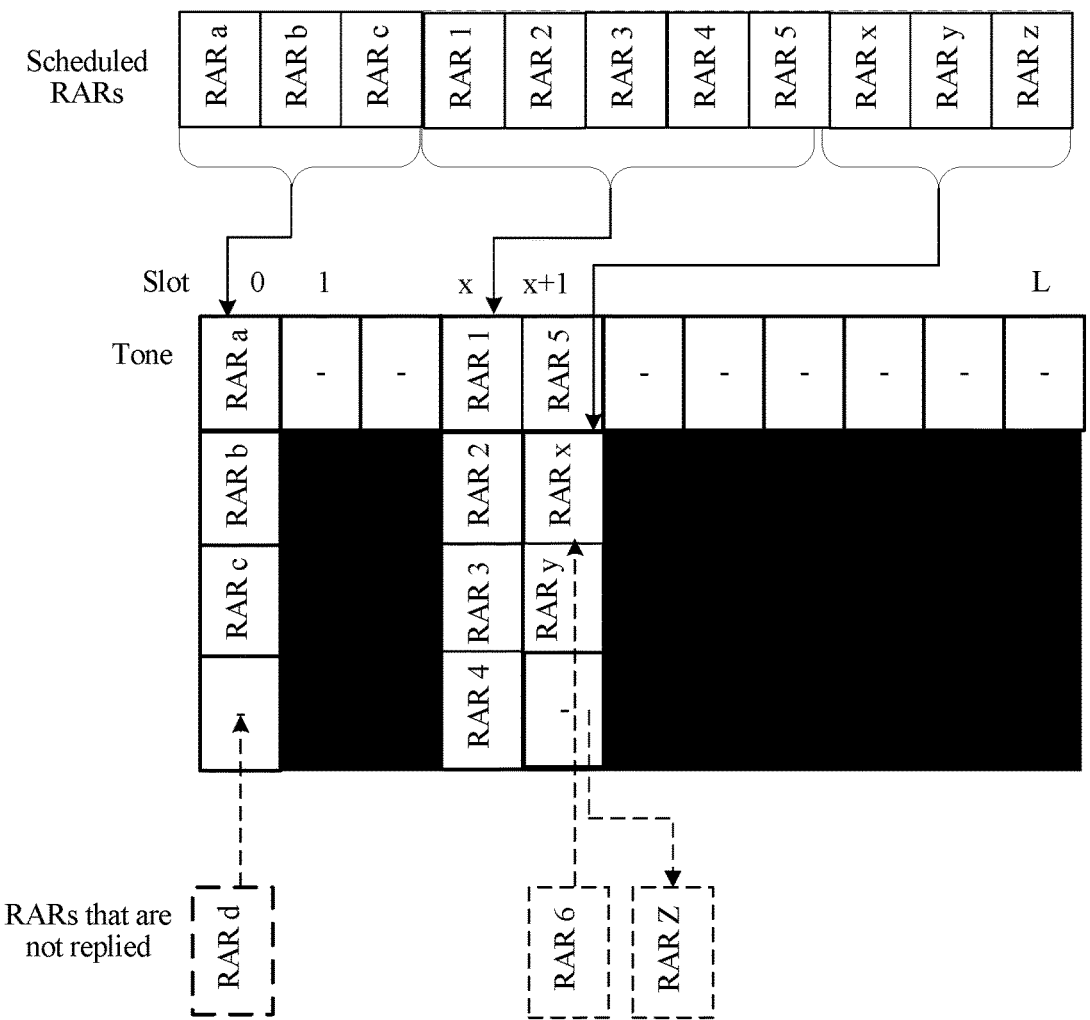

Referring to FIG. 6, another embodiment of a control information sending method provided in the embodiments of the present invention may include the following content:

601. A base station sorts, based on all control information that is at a target coverage level and that needs to be sent, the control information according to a preset first-priority sorting rule.

In this embodiment, optionally, the preset first-priority sorting rule is a preset sorting rule of a random value output from a first random function, and input of the first random function includes characteristic information corresponding to the control information, or the preset first-priority sorting rule is a preset sorting rule of a control information type.

602. The base station correspondingly allocates, based on a sorting sequence of all the control information that needs to be sent and according to a preset sorting sequence of available resource blocks at the target coverage level of the base station, a resource block to the control information that needs to be sent.

603. The base station sends the corresponding control information based on the allocated resource block.

In this embodiment, the base station allocates, based on step 602, the resource block to the control information that needs to be sent. In this case, the allocated resource block is corresponding to the control information. The base station may send the corresponding control information based on the allocated resource block.

In this embodiment of the present invention, based on a sorting sequence of all the control information that needs to be sent and according to a preset sorting sequence of available resource blocks at a target coverage level of the base station, a resource block is correspondingly allocated to the control information that needs to be sent, so that user equipment reads target control information from a resource block scheduled by the base station for the user equipment. In this process, the user equipment detects a resource block according to a priority of the user equipment, and does not need to blindly detect all resource blocks. This reduces power overheads of UE when resource scheduling is performed on the UE.

Optionally, in this embodiment of the present invention, the available resource blocks at the target coverage level of the base station are sorted according to a time location sequence of the resource blocks.

That the base station correspondingly allocates, based on a sorting sequence of the control information and according to a preset sorting sequence of available control information resource blocks at the target coverage level of the base station, a control information resource block to the control information block that needs to be sent includes:

sequentially establishing, by the base station, a correspondence between first priorities of all the control information and the available resource blocks based on the first priorities of the control information and time locations in the available resource blocks; and selecting, by the base station for target control information with a same first priority sequence, a resource block from the available resource blocks at the target coverage level of the base station in a time location corresponding to a first priority of the target control information, and allocating the resource block to the target control information.

For example, as shown in FIG. 6-1, an example in which a time unit is a slot is used. It is assumed that identification information corresponding to all the control information is UE-IDs (a TLLI identifier, an IMSI identity, a C-RNTI identifier, or the like) of user equipments UEs corresponding to all the control information. As shown in the figure, the user equipments UEs (scheduled UEs) corresponding to all the control information include UE a, UE b, UE c, UE 1, UE 2, and UE 3. Random values obtained by calculating UE-IDs of the UE a, the UE b, and the UE c by using a hash function hash are the same, that is, first priorities of control information corresponding to the UE a, the UE b, and the UE c are the same. A time location corresponding to the first priorities is a slot 0, and therefore, resource blocks are selected from the slot 0 and allocated to the control information corresponding to the UE a, the UE b, and the UE c. Random values obtained by calculating UE-IDs of the UE 1, the UE 2, and the UE 3 by using the hash function hash are the same, that is, first priorities of control information corresponding to the UE 1, the UE 2, and the UE 3 are the same. A time location corresponding to the first priorities of the control information is a slot x, and therefore, resource blocks are selected from the slot x and allocated to the control information corresponding to the UE 1, the UE 2, and the UE 3.

The example in which a time unit is a slot is used above. Actually, the time unit is a time length corresponding to a resource block (Resource Segmentation) corresponding to control information at the coverage level. For example, if each resource block RS at a coverage level 0 occupies a time of four subcarriers*one slot, for the coverage level 0, one time unit is one slot. If each resource block RS corresponding to a coverage level 1 occupies a time of four subcarriers*three slots, for the coverage level 1, each time unit is three slots.

Optionally, an optional implementation of separately establishing a correspondence between value ranges of random values of the random function and time units corresponding to all resource blocks at the coverage level may be as follows: A mod T operation is performed on the random values generated from the hash function. T is a quantity of time units corresponding to all the resource blocks at the coverage level.

Optionally, the available resource blocks at the target coverage level of the base station are sorted according to the preset resource block sorting rule.

That the base station correspondingly allocates, based on a sorting sequence of the control information and according to a preset sorting sequence of available resource blocks at the target coverage level of the base station, a resource block to the control information that needs to be sent includes:

starting from the first available resource block, allocating, by the base station to all target control information based on sorting of first priorities of all the control information that needs to be sent, available resource blocks in a one-to-one correspondence with all the target control information.

Optionally, that a resource block in the available resource blocks of the user equipment that is scheduled by the base station for the user equipment is detected according to a preset sorting sequence of the available resource blocks includes:

starting from the first available resource block, reading and detecting, according to a first priority of the user equipment, resource blocks scheduled by the base station for the user equipment one by one.

For example, as shown in FIG. 6-2, user equipments UEs (that is, UEs that need to be scheduled, scheduled UEs) corresponding to all the control information include UE a, UE b, UE c, UE 1, UE 2, UE 3, UE 4, UE 5, UE x, and UE y. Random values obtained by calculating UE-IDs of the UE a, the UE b, and the UE c according to a hash function hash (for example, the first random function is a hash function) are the same, and control information corresponding to the UE a, the UE b, and the UE c is corresponding to a same first priority. Random values obtained by calculating UE-IDs of the UE 1, the UE 2, the UE 3, the UE 4, and the UE 5 according to the hash function hash are the same, and control information corresponding to the UE 1, the UE 2, the UE 3, the UE 4, and the UE 5 is corresponding to a same first priority. Random values obtained by calculating UE-IDs of the UE x and the UE y according to the hash function hash are the same, and control information corresponding to the UE x and the UE y is corresponding to a same first priority. In this case, if corresponding priorities of all the control information are in descending order, starting from the first available resource block, the base station allocates, to all target control information based on sorting of the first priorities of all the control information that needs to be sent, available resource blocks in a one-to-one correspondence with all the target control information, as shown in FIG. 6-2.

Starting from the first available resource block, scheduled UE such as the UE b reads a resource block corresponding to control information of the UE a, and finds, by checking the control information in the resource block corresponding to the UE a, that a first priority of the first resource block is the same as a first priority of the UE b, and that identification information of the UE a does not match identification information (an ID of the UE b) corresponding to the UE b. In this case, the UE b knows that this resource block does not carry control information of the UE b, and therefore continues reading an available resource block. When reading the second resource block, the UE b checks control information in the resource block to find that characteristic information (identification information of the control information) of the control information in the read resource block matches the identification information corresponding to the UE b. In this case, the UE b considers that this resource block is control information sent to the UE b. After reading the control information of the UE b, the UE b stops reading an available resource block, and performs a subsequent sending or receiving operation based on the read control information of the UE b.

Starting from the first available resource block, unscheduled UE such as the UE d separately reads the first three resource blocks (resource blocks corresponding to the control information of the UE a, the UE b, and the UE c), and finds, by checking the control information in the resource blocks, that first priorities of the three resource blocks are the same as a first priority of the UE d, and that identification information of the UEs does not match identification information (an ID of the UE 1) corresponding to the UE d. In this case, the UE d knows that these resource blocks do not carry control information of the UE b, and therefore continues reading an available resource block. When reading the fourth resource block (which is corresponding to the control information of the UE 1), the UE d finds that a hash value of the fourth resource block is already greater than a hash value of the UE c, and therefore, considers that a first priority of the fourth resource block is lower than the first priority corresponding to the UE d. Therefore, the UE d stops reading and detecting a resource block, and considers that control information sent to the UE d does not exist in these available control information resource blocks.

Optionally, an optional implementation of separately establishing a correspondence between value ranges of random values of the random function and all the resource blocks at the coverage level may be as follows: A mod M operation is performed on the random values generated from the hash function. M is a quantity of all the resource blocks at the coverage level. Alternatively, the random function is the hash function.

Optionally, the available resource blocks at the target coverage level of the base station are grouped every N resource blocks and are sorted according to group numbers of the resource blocks.

That the base station correspondingly allocates, based on a sorting sequence of the control information and according to a preset sorting sequence of available resource blocks at the target coverage level of the base station, a resource block to the control information block that needs to be sent includes:

sequentially establishing, by the base station, a correspondence between first priorities of all the control information and the available resource blocks based on the first priorities of the control information and the group numbers of the available resource blocks; and in the available resource blocks at the target coverage level of the base station, selecting, by the base station for target control information with a same first priority and from a resource block group corresponding to a group number corresponding to the first priority of the target control information, a resource block to send the target control information.

Optionally, when the first priority is a random value generated from a random function, an optional implementation of establishing a correspondence between value ranges of random values of the random function and resource block group numbers of all the resource blocks at the coverage level may be as follows: A mod G operation is performed on the random values generated from the hash function. G is a quantity of resource block groups corresponding to all the resource blocks at the coverage level.

Optionally, when the available resource blocks at the target coverage level of the base station are sorted according to the time location sequence of the resource blocks, the selecting, for target control information with a same first priority sequence, a resource block in a time location corresponding to a first priority of the target control information, and allocating the resource block to the target control information includes:

placing, by the base station, the target control information with a same first priority in a resource block in a corresponding time unit location; and if a quantity of target control information with a same first priority exceeds a quantity of resource blocks in the corresponding time unit location, sequentially placing, by the base station, target control information that is unable to be placed in the corresponding time unit location in a time unit location corresponding to a next first priority; where target control information corresponding to the next first priority is placed behind the target control information that is with the first priority and that is unable to be placed in the corresponding time unit location.

When the available resource blocks at the target coverage level of the base station are grouped every N resource blocks and are sorted according to the group numbers of the resource blocks, the selecting, for target control information with a same first priority and from a resource block group corresponding to a group number corresponding to the first priority of the target control information, a resource block to send the target control information includes:

placing, by the base station, the target control information with a same first priority in a resource block with the corresponding group number; and if a quantity of target control information with a same first priority exceeds a quantity of resource blocks in the resource block group corresponding to the corresponding group number, sequentially placing, by the base station, target control information that is unable to be placed in the resource block corresponding to the corresponding group number in a resource block with a group number corresponding to a next first priority; where target control information corresponding to the next first priority is placed behind the target control information that is with the first priority and that is unable to be placed in the resource block corresponding to the corresponding group number.

Optionally, that a base station sorts, based on all control information that is at a target coverage level and that needs to be sent, the control information according to a first-priority sorting rule further includes:

sorting, by the base station according to a second-priority sorting rule, control information that is with a same first priority and that is in all the control information that needs to be sent.

Optionally, when the first-priority sorting rule is the preset sorting rule of the random value output from the first random function, and the input of the first random function includes the characteristic information corresponding to the control information, the second-priority sorting rule is the preset sorting rule of the control information type; and the sorting, by the base station according to a second-priority sorting rule, control information that is with a same first priority and that is in all the control information that needs to be sent includes:

sorting, by the base station according to the preset sorting rule of the control information type, the control information that is with a same first priority and that is in all the control information that needs to be sent.

For example, as shown in FIG. 6-3, like FIG. 6-1, user equipments UEs (scheduled UEs) corresponding to all the control information include UE a, UE b, UE c, UE 1, UE 2, and UE 3. After sorting performed in FIG. 6-1, first priorities of the UE a, the UE b, the UE c are the same, and first priorities of the UE 1, the UE 2, and the UE 3 are the same. Therefore, sorting may be further performed according to a priority of a control information type. For example, it is assumed that a preset sequence of priorities of control information types is a paging message, a RACH response message, and normal data transmission. According to control information corresponding to UE with a same first priority, control information corresponding to the UE a is normal data transmission, a control information type corresponding to the UE b, the UE 1, and the UE 3 is a paging message, and a control information type corresponding to the UE c and the UE 2 is a RACH response message. Therefore, sorting may be further performed according to a control information type. For example, the UE 1, the UE 2, and the UE 3 are sorted in the following sequence: the UE 1, the UE 3, and the UE 2.

Optionally, when the first-priority sorting rule is the preset sorting rule of the control information type, the second-priority sorting rule is for sorting based on an output value of a preset second random function, and input of the second random function includes the characteristic information corresponding to the control information; and the sorting, by the base station according to a second-priority sorting rule, control information that is with a same first priority and that is in all the control information that needs to be sent includes:

calculating, by the base station according to the second random function and the characteristic information corresponding to all the control information that needs to be sent, random values corresponding to all the control information; and sorting, by the base station, all the control information based on the random values corresponding to all the control information.

Optionally, when the available resource blocks at the target coverage level of the base station are sorted according to a time location sequence of the resource blocks, the selecting, for target control information with a same first priority sequence, a resource block in a time location corresponding to a first priority of the target control information, and allocating the resource block to the target control information includes:

for the target control information with a same first priority, selecting, by the base station, a resource block in a corresponding time unit location according to a second priority of the target control information and according to a preset sequence of resource blocks in a same time unit location, and allocating the resource block to the target control information.

When the available resource blocks at the target coverage level of the base station are grouped every N resource blocks and are sorted according to the group numbers of the resource blocks, the selecting, for target control information with a same first priority and from a resource block group corresponding to a group number corresponding to the first priority of the target control information, a resource block to send the target control information includes:

for the target control information with a same first priority, selecting, by the base station according to a second priority of the target control information and according to a preset sequence in a same resource block group, a resource block from a resource block corresponding to the corresponding group number, and allocate the resource block to the target control information.

Optionally, the characteristic information corresponding to the control information is at least one of identification information corresponding to the control information, time information for sending the control information, or a message type corresponding to the control information.

Optionally, if the target control information is scheduling information of a RACH acknowledgement message from the base station in response to a target RACH request, the identification information corresponding to the target control information is a random number included in the target RACH request.

As shown in FIG. 6-4, user equipments UEs (scheduled UEs) corresponding to all the control information include UE a, UE b, UE c, UE 1, UE 2, UE 3, UE 4, UE 5, UE x, and UE y. Corresponding control information of the UEs are RACH response (RAR) messages that are respectively a RAR a, a RAR b, a RAR c, a RAR 1, a RAR 2, a RAR 3, a RAR 4, a RAR 5, a RAR x, and a RAR y. The identification information corresponding to the target control information is random numbers random numbers included in RACH requests corresponding to the RARs. Random values are obtained by calculating the random numbers random numbers according to a hash function hash (for example, the first random function is a hash function) or random values are obtained directly by performing a modulo operation in the random function. First priorities of all the control information corresponding to the UEs are determined. In this case, the base station sequentially establishes a correspondence between the first priorities of the control information and the available resource blocks based on sorting of the first priorities of all the control information that needs to be sent and based on the first priorities of all the control information and time locations in the available resource blocks. For target control information with a same first priority sequence, the base station selects a resource block from the available resource blocks at the target coverage level of the base station in a time location corresponding to a first priority of the target control information, and allocates the resource block to the target control information. As shown in FIG. 6-4, a resource block may be selected for the RAR control information in a manner in which available resource blocks in a one-to-one correspondence with all target control information are allocated to all the target control information starting from the first available resource block, or in a manner in which a correspondence is established between a first priority and a group number.

If the target control information is corresponding to a paging request message from the base station to target user equipment, the identification information corresponding to the target control information is an identifier of the target user equipment; or if the target control information is uplink data scheduling information or downlink data scheduling information from the base station to target user equipment, the identification information corresponding to the target control information is an identifier of the target user equipment.

In this embodiment, optionally, before the base station correspondingly allocates, based on the sorting sequence of all the control information that needs to be sent and according to the preset sorting sequence of the available resource blocks at the target coverage level of the base station, the resource block to the control information resource block that needs to be sent, the method may further include:

sorting, by the base station, available resource blocks at the target coverage level that are in a current control information sending period.

The following describes an embodiment of a control information detection method corresponding to the embodiment shown in FIG. 6.

Figure 7:
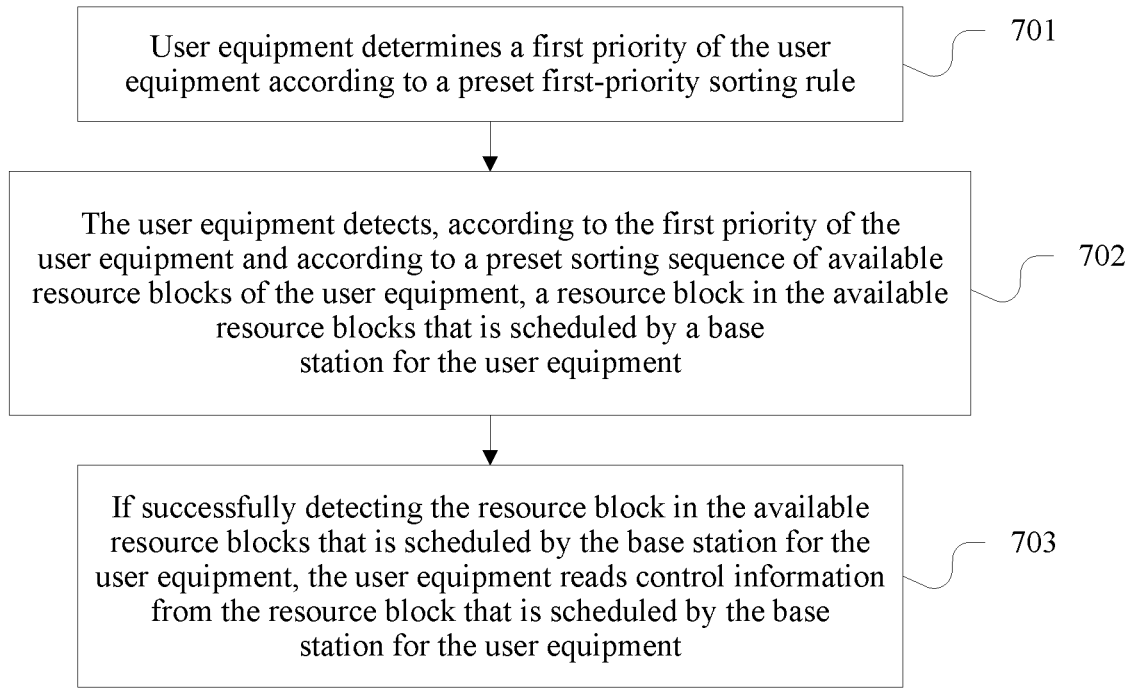
FIG. 7 is a schematic diagram of another embodiment of a control information detection method according to the embodiments of the present invention.

Referring to FIG. 7, another embodiment of a control information detection method provided in the embodiments of the present invention may include the following content:

701. User equipment determines a first priority of the user equipment according to a preset first-priority sorting rule.

In this embodiment, optionally, the preset first-priority sorting rule may be a preset sorting rule of a random value output from a first random function, and input of the first random function may include identification information corresponding to the user equipment.

In this case, that user equipment determines a first priority of the user equipment according to a preset first-priority sorting rule includes:

calculating, by the user equipment according to the first random function and the characteristic information corresponding to the user equipment, a random value corresponding to the user equipment; and determining, by the user equipment, the first priority of the user equipment based on the random value corresponding to the user equipment and the preset sorting rule of the random value output from the first random function.

Optionally, the preset first-priority sorting rule may be a preset sorting rule of a control information type.

In this case, that user equipment determines a first priority of the user equipment according to a preset first-priority sorting rule includes:

determining, by the user equipment, the first priority of the user equipment based on a type of control information that the user equipment needs to receive and according to the preset sorting rule of the control information type.

702. The user equipment detects, according to the first priority of the user equipment and according to a preset sorting sequence of available resource blocks of the user equipment, a resource block in the available resource blocks that is scheduled by the base station for the user equipment.

703. If successfully detecting the resource block in the available resource blocks that is scheduled by the base station for the user equipment, the user equipment reads control information from the resource block that is scheduled by the base station for the user equipment.

In this embodiment of the present invention, based on a sorting sequence of all the control information that needs to be sent and according to a preset sorting sequence of available resource blocks at a target coverage level of the base station, user equipment detects a resource block scheduled by the base station for the user equipment. In this process, the user equipment detects a resource block according to a priority of the user equipment, and does not need to blindly detect all resource blocks. This reduces power overheads of UE when resource scheduling is performed on the UE.

Optionally, the first priority of the user equipment is corresponding to a start reading time location of the available resource blocks of the user equipment.

That the user equipment detects, according to the first priority of the user equipment and according to a preset sorting sequence of available resource blocks of the user equipment, a resource block allocated by the base station to the user equipment includes:

determining, by the user equipment according to the first priority of the user equipment, the start reading time location that is of the available resource blocks of the user equipment and that is corresponding to the first priority of the user equipment; and starting from the first resource block in the start reading time location, detecting, by the user equipment according to the preset sorting sequence of the available resource blocks of the user equipment, the resource block allocated by the base station to the user equipment.

Optionally, the first priority of the user equipment is corresponding to a start reading resource block location of the available resource blocks of the user equipment at a target coverage level.

That the user equipment detects, according to the first priority of the user equipment and according to a preset sorting sequence of available resource blocks of the user equipment, a resource block allocated by the base station to the user equipment includes:

determining, by the user equipment according to the first priority of the user equipment, the start reading resource block location that is of the available resource blocks of the user equipment and that is corresponding to the first priority of the user equipment; and starting from the start reading resource block location, detecting, by the user equipment according to the preset sorting sequence of the available resource blocks of the user equipment, the resource block allocated by the base station to the user equipment.

Optionally, when detecting the resource block allocated by the base station to the user equipment, the user equipment stops detection if the first priority of the user equipment is lower than a priority of a detected resource block or a resource block used to instruct to stop detection is successfully detected.

As shown in FIG. 6-1, a first priority of scheduled UE 2 is a time unit location X correspondingly obtained based on a hash function of a UE_ID and a hash value of an ID of the UE 2. In the example, one resource block occupies one slot. Therefore, an $X^{th}$ time unit location is an $X^{th}$ slot. In this case, starting from a start time location: the $X^{th}$ slot, the UE 2 separately reads resource blocks corresponding to control information of UE 1, the UE 2, and UE 3, and finds, by checking control information in a resource block corresponding to the UE 1, that a first priority of the UE 1 is the same as a first priority of the UE 2, and that identification information of the UE 1 does not match identification information (an ID of the UE 2) corresponding to the UE 2. In this case, the UE 2 knows that this resource block does not carry control information of the UE 2, and therefore continues reading a subsequent resource block. The UE 2 reads a next resource block, checks control information in the resource block, and if finding that characteristic information (identification information of the control information) of the control information in the read resource block is the same as the identification information corresponding to the UE 2, considers that this resource block is control information sent to the UE 2.

Optionally, the user equipment determines a priority of the user equipment according to a preset first-priority rule, and the method further includes:

determining, by the user equipment, a second priority of the user equipment according to a preset second-priority sorting rule.

Optionally, when the preset first-priority sorting rule is a preset sorting rule of a random value output from a first random function, and input of the first random function includes the identification information corresponding to the user equipment, the preset second-priority sorting rule is a preset sorting rule of a control information type; and the determining, by the user equipment, a second priority of the user equipment according to a preset second-priority sorting rule includes:

determining, by the user equipment, the second priority of the user equipment according to the preset sorting rule of the control information type and according to a type of control information that the user equipment needs to receive.

Optionally, when the preset first-priority sorting rule is a preset sorting rule of a control information type, the preset second-priority sorting rule is a preset sorting rule of a random value output from a second random function, and input of the second random function includes characteristic information corresponding to the user equipment; and the determining, by the user equipment, a second priority of the user equipment according to a preset second-priority sorting rule includes:

calculating, by the user equipment according to the second random function and the characteristic information corresponding to the user equipment, a random value corresponding to the user equipment; and determining, by the user equipment, the second priority of the user equipment based on the random value corresponding to the user equipment and the preset sorting rule of the random value output from the second random function.

Optionally, the first priority of the user equipment is corresponding to a start reading time location of the available resource blocks of the user equipment, and the second priority of the user equipment is corresponding to a start reading resource block in the start reading time location.

That the user equipment detects, according to the first priority of the user equipment and according to a preset sorting sequence of available resource blocks of the user equipment, a resource block allocated by the base station to the user equipment includes:

determining, by the user equipment according to the first priority of the user equipment, the start reading time location that is of the available resource blocks of the user equipment and that is corresponding to the first priority of the user equipment;

determining, by the user equipment according to the second priority of the user equipment, a start reading resource block location that is in the start reading time location and that is corresponding to the second priority of the user equipment; and starting from the start reading resource block location in the start reading time location, detecting, by the user equipment according to the preset sorting sequence of the available resource blocks of the user equipment, the resource block allocated by the base station to the user equipment.

Optionally, when detecting the resource block allocated by the base station to the user equipment, the user equipment stops detection if the second priority of the user equipment is lower than a second priority of a detected resource block or a resource block used to instruct to stop detection is successfully detected.

As shown in FIG. 6-1, for unscheduled UE 4, a time unit location X is correspondingly obtained based on a hash function of a UE_ID and a hash value of an ID of UE 4. In the example, one resource block occupies one slot. Therefore, an $X^{th}$ time unit location is an $X^{th}$ slot. In this case, starting from a start time location: the $X^{th}$ slot, the UE 4 separately reads resource blocks corresponding to control information of UE 1, UE 2, and UE 3, and finds, by checking the control information in the corresponding resource blocks, that first priorities corresponding to the three resource blocks are the same as a first priority of the UE 4, and that identification information of the UEs does not match identification information (the ID of the UE 4) corresponding to the UE 4. In this case, the UE 4 knows that this resource block does not carry control information of the UE 4, and therefore continues reading a subsequent resource block until the fourth block in the $X^{th}$ slot is read. The block is a resource block that instructs to stop detection, and the UE 4 stops reading a resource block. Therefore, the UE 4 is prevented from reading a subsequent resource block, thereby reducing power consumption.

Optionally, the characteristic information corresponding to the user equipment may be identification information (such as a TLLI identifier, an IMSI identity, or a C-RNTI) of the user equipment or a message type corresponding to control information that the user equipment needs to receive.

Figure 8:
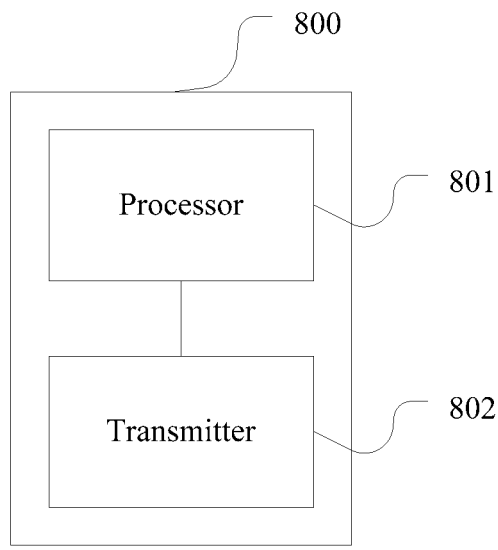
FIG. 8 is a schematic diagram of an embodiment of a base station according to the embodiments of the present invention.

The following describes an embodiment of a base station in the embodiments of the present invention. Referring to FIG. 8, an embodiment of a base station 800 provided in the embodiments of the present invention may include the following content:

a processor 801, configured to determine target control information and characteristic information corresponding to the target control information, where the target control information is information for scheduling target user equipment by the base station; where the processor 801 is further configured to: determine, according to a preset rule and the characteristic information from a resource block set corresponding to a target coverage level, a target resource block subset corresponding to the target control information, and select, from the target resource block subset, any available resource block as a target resource block, where the target coverage level is a coverage level corresponding to a location at which the target user equipment is located in a coverage area of the base station; and a transmitter 802, configured to send the target control information by using the target resource block.

In this embodiment of the present invention, a processor 801 of the base station first determines a target resource block subset from a resource block set corresponding to a target coverage level, and selects, for target control information, a resource block from the target resource block subset, so that user equipment also determines a target resource block subset, and detects, in the target resource block subset, a resource block scheduled by the base station for the user equipment. In this process, the user equipment does not need to read all resource blocks. This reduces power overheads of UE when resource scheduling is performed on the UE.

Optionally, the characteristic information corresponding to the target control information is at least one of identification information corresponding to the target control information, time information for sending the target control information, or a message type corresponding to the target control information.

Optionally, if the target control information is corresponding to scheduling information of a random access channel RACH acknowledgement message from the base station in response to a target RACH request, the identification information corresponding to the target control information is a random number included in the target RACH request; or if the target control information is corresponding to a paging request message from the base station to the target user equipment, the identification information corresponding to the target control information is an identifier of the target user equipment; or if the target control information is corresponding to uplink data scheduling or downlink data scheduling from the base station to the target user equipment, the identification information corresponding to the target control information is an identifier of the target user equipment.

Optionally, the processor 801 is specifically configured to: obtain a quantity N of resource blocks that are readable for the target user equipment; sort and number resource blocks in the resource block set according to the preset rule; and separately calculate N random values according to preset N random functions and based on the characteristic information corresponding to the target control information, and establish a correspondence between each random value and one resource block to determine the N resource blocks, to form the target resource block subset corresponding to the target control information.

Optionally, the base station includes a first random function set, and the first random function set includes X random functions.

The processor 801 is specifically configured to: obtain a quantity X of time units that are readable for the target user equipment, and separately determine multiple resource blocks in the X time units from the resource block set according to the X random functions and based on the characteristic information corresponding to the target control information, to form the target resource block subset corresponding to the target control information.

Optionally, the processor 801 is specifically configured to: separately calculate X random values according to the preset X random functions and based on the characteristic information corresponding to the target control information, and establish a correspondence between each random value and one time unit, where all resource blocks in the X time units form the target resource block subset.

Optionally, the base station further includes a second random function set, and the second random function set includes Y random functions.

The processor 801 is specifically configured to: separately calculate X random values according to the preset X random functions and based on the characteristic information corresponding to the target control information, and establish a correspondence between each random value and one time unit to determine the X time units; and separately calculate Y random values for a resource block in each of the X time units according to the Y random functions and based on the characteristic information corresponding to the target control information, to determine Y corresponding resource blocks, so as to obtain N resource blocks corresponding to the target control information, to form the target resource block subset corresponding to the target control information, where N=X*Y.

Figure 9:
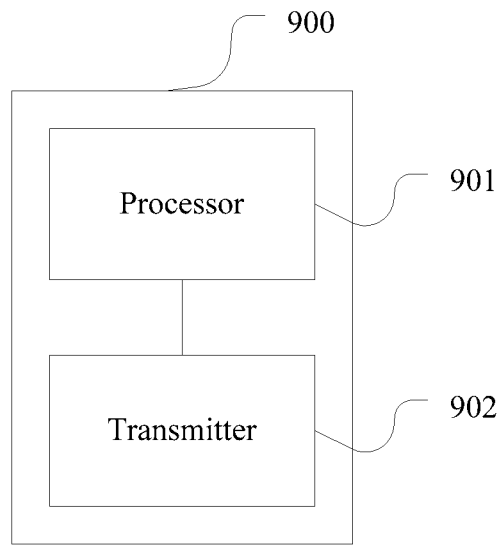
FIG. 9 is a schematic diagram of another embodiment of a base station according to the embodiments of the present invention.

Referring to FIG. 9, another embodiment of a base station 900 provided in the embodiments of the present invention may include the following content:

a processor 901, configured to sort, based on all control information that is at a target coverage level and that needs to be sent, the control information according to a preset first-priority sorting rule; where the processor 901 is further configured to correspondingly allocate, based on a sorting sequence of the control information and according to a preset sorting sequence of available resource blocks at the target coverage level of the base station, a resource block to the control information that needs to be sent; and a transmitter 902, configured to send the corresponding control information based on the resource block allocated by the processor.

In this embodiment of the present invention, based on a sorting sequence of all the control information that needs to be sent and according to a preset sorting sequence of available resource blocks at a target coverage level of the base station, a processor 901 correspondingly allocates a resource block to the control information that needs to be sent, so that user equipment reads target control information from a resource block scheduled by the base station for the user equipment. In this process, the user equipment detects a resource block according to a priority of the user equipment, and does not need to blindly detect all resource blocks. This reduces power overheads of UE when resource scheduling is performed on the UE.

Optionally, the preset first-priority sorting rule is a preset sorting rule of a random value output from a first random function, and input of the first random function includes characteristic information corresponding to the control information, or the preset first-priority sorting rule is a preset sorting rule of a control information type.

Optionally, the available resource blocks at the target coverage level of the base station are sorted according to a time location sequence of the resource blocks.

The processor 901 is specifically configured to: sequentially establish a correspondence between first priorities of all the control information and the available resource blocks based on the first priorities of the control information and time locations in the available resource blocks; and for target control information with a same first priority sequence, select a resource block from the available resource blocks at the target coverage level of the base station in a time location corresponding to a first priority of the target control information, and allocate the resource block to the target control information.

Optionally, the available resource blocks at the target coverage level of the base station are sorted according to the preset resource block sorting rule.

The processor 901 is specifically configured to: starting from the first available resource block, allocate, to all target control information based on sorting of first priorities of all the control information that needs to be sent, available resource blocks in a one-to-one correspondence with all the target control information.

Optionally, the available resource blocks at the target coverage level of the base station are grouped every N resource blocks and are sorted according to group numbers of the resource blocks.

The processor 901 is specifically configured to: sequentially establish a correspondence between first priorities of all the control information and the available resource blocks based on the first priorities of the control information and the group numbers of the available resource blocks; and in the available resource blocks at the target coverage level of the base station, for target control information with a same first priority, select, from a resource block group corresponding to a group number corresponding to the first priority of the target control information, a resource block to send the target control information.

Optionally, when the available resource blocks at the target coverage level of the base station are sorted according to the time location sequence of the resource blocks, the processor 901 is specifically configured to: place the target control information with a same first priority in a resource block in a corresponding time unit location; and if a quantity of target control information with a same first priority exceeds a quantity of resource blocks in the corresponding time unit location, sequentially place target control information that is unable to be placed in the corresponding time unit location in a time unit location corresponding to a next first priority, where target control information corresponding to the next first priority is placed behind the target control information that is with the first priority and that is unable to be placed in the corresponding time unit location.

When the available resource blocks at the target coverage level of the base station are grouped every N resource blocks and are sorted according to the group numbers of the resource blocks, the processor 901 is specifically configured to: place the target control information with a same first priority in a resource block with the corresponding group number; and if a quantity of target control information with a same first priority exceeds a quantity of resource blocks in the resource block group corresponding to the corresponding group number, sequentially place target control information that is unable to be placed in the resource block corresponding to the corresponding group number in a resource block with a group number corresponding to a next first priority, where target control information corresponding to the next first priority is placed behind the target control information that is with the first priority and that is unable to be placed in the resource block corresponding to the corresponding group number.

Optionally, the processor is specifically configured to sort, according to a second-priority sorting rule, control information that is with a same first priority and that is in all the control information that needs to be sent.

Optionally, when the first-priority sorting rule is the preset sorting rule of the random value output from the first random function, and the input of the first random function includes the characteristic information corresponding to the control information, the second-priority sorting rule is the preset sorting rule of the control information type; and the processor is specifically configured to sort, according to the preset sorting rule of the control information type, the control information that is with a same first priority and that is in all the control information that needs to be sent.

Optionally, when the first-priority sorting rule is the preset sorting rule of the control information type, the second-priority sorting rule is for sorting based on an output value of a preset second random function, and input of the second random function includes the characteristic information corresponding to the control information; and the processor is specifically configured to: calculate, according to the second random function and the characteristic information corresponding to all the control information that needs to be sent, random values corresponding to all the control information, and sort all the control information based on the random values corresponding to all the control information.

Optionally, when the available resource blocks at the target coverage level of the base station are sorted according to a time location sequence of the resource blocks, the processor is specifically configured to: for target control information with a same first priority, select a resource block in a corresponding time unit location according to a second priority of the target control information and according to a preset sequence of resource blocks in a same time unit location, and allocate the resource block to the target control information.

When the available resource blocks at the target coverage level of the base station are grouped every N resource blocks and are sorted according to group numbers of the resource blocks, the processor is specifically configured to: for target control information with a same first priority, select, according to a second priority of the target control information and according to a preset sequence in a same resource block group, a resource block from a resource block corresponding to a corresponding group number, and allocate the resource block to the target control information.

Figure 10:
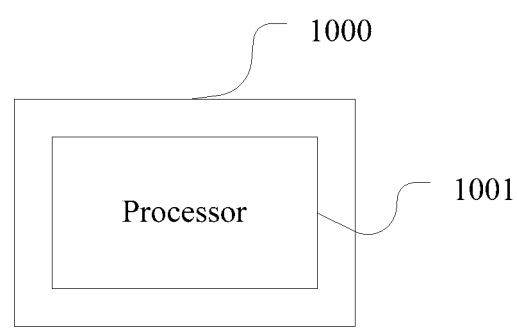
FIG. 10 is a schematic diagram of an embodiment of user equipment according to the embodiments of the present invention.

The following describes an embodiment of user equipment in the embodiments of the present invention. Referring to FIG. 10, an embodiment of user equipment 1000 provided in the embodiments of the present invention includes the following content:

a processor 1001, configured to: determine, according to a preset rule and preset characteristic information, a target resource block subset from a resource block set corresponding to a current coverage level, where the current coverage level is a coverage level corresponding to a location at which the user equipment is located in a coverage area of a base station.

The processor 1001 is further configured to: separately detect resource blocks in the target resource block subset, and if identification information in control information carried in any resource block in the target resource block subset is the same as identification information of the user equipment, determine that the any resource block is a resource block scheduled by the base station for the user equipment.

The processor 1001 is further configured to read the control information carried in the any resource block.

In this embodiment of the present invention, a processor 1001 first determines a target resource block subset from a resource block set corresponding to a target coverage level, and detects, in the target resource block subset, a resource block scheduled by a base station for user equipment. In this process, the user equipment does not need to read all resource blocks. This reduces power overheads of UE when resource scheduling is performed on the UE.

Optionally, the preset characteristic information is at least one of the identification information corresponding to the user equipment or a message type of a message that the user equipment needs to receive.

Optionally, if the user equipment sends a RACH request and waits for the base station to feed back a RACH acknowledgement message, the identification information corresponding to the user equipment is a random number included in the RACH request; or if the user equipment waits to receive a paging request message, the identification information corresponding to the user equipment is the identification information of the user equipment; or if the user equipment waits for uplink data scheduling or downlink data scheduling by the base station, the identification information corresponding to the user equipment is the identification information of the user equipment.

Optionally, the processor 1001 is specifically configured to: obtain a quantity N of resource blocks that are readable for the user equipment; sort and number resource blocks in the resource block set according to the preset rule; and separately calculate N random values according to preset N random functions and based on the characteristic information corresponding to the user equipment, and establish a correspondence between each random value and one resource block to determine the N resource blocks, to form the target resource block subset.

Optionally, the user equipment includes a first random function set, and the first random function set includes X random functions.

The processor 1001 is specifically configured to: obtain a quantity X of time units that are readable for the user equipment, and separately determine multiple resource blocks in the X time units from the resource block set according to the X random functions and based on the preset characteristic information, to form the target resource block subset.

Optionally, the processor 1001 is specifically configured to: separately calculate X random values according to the preset X random functions and based on the preset characteristic information, and establish a correspondence between each random value and one time unit, where all resource blocks in the X time units form the target resource block subset.

Optionally, the user equipment further includes a second random function set, and the second random function set includes Y random functions.

The processor 1001 is specifically configured to: separately calculate X random values according to the preset X random functions and based on the characteristic information corresponding to the user equipment, and establish a correspondence between each random value and one time unit to determine the X time units; and separately calculate Y random values for a resource block in each of the X time units according to the Y random functions and based on the preset characteristic information, to determine Y corresponding resource blocks, so as to obtain N resource blocks corresponding to the target control information, to form the target resource block subset, where N=X*Y.

Figure 11:
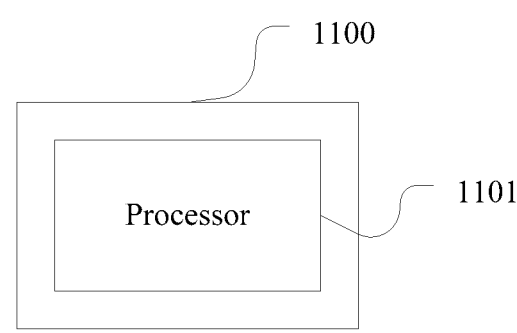
FIG. 11 is a schematic diagram of another embodiment of user equipment according to the embodiments of the present invention.

Referring to FIG. 11, another embodiment of user equipment 1100 provided in the embodiments of the present invention includes the following content:

a processor 1101, configured to: determine a first priority of the user equipment according to a preset first-priority sorting rule; detect, according to the first priority of the user equipment and according to a preset sorting sequence of available resource blocks of the user equipment, a resource block in the available resource blocks that is scheduled by the base station for the user equipment; and if successfully detecting the resource block in the available resource blocks that is scheduled by the base station for the user equipment, read control information from the resource block that is scheduled by the base station for the user equipment.

In this embodiment of the present invention, based on a sorting sequence of all the control information that needs to be sent and according to a preset sorting sequence of available resource blocks at a target coverage level of the base station, a processor 1101 detects a resource block scheduled by the base station for user equipment. In this process, the user equipment detects a resource block according to a priority of the user equipment, and does not need to blindly detect all resource blocks. This reduces power overheads of UE when resource scheduling is performed on the UE.

Optionally, the preset first-priority sorting rule is a preset sorting rule of a random value output from a first random function, and input of the first random function includes characteristic information corresponding to the user equipment.

The processor 1101 is specifically configured to: calculate, according to the first random function and the characteristic information corresponding to the user equipment, a random value corresponding to the user equipment; and determine the first priority of the user equipment based on the random value corresponding to the user equipment and the preset sorting rule of the random value output from the first random function.

Optionally, the preset first-priority sorting rule is a preset sorting rule of a control information type.

The processor 1101 is specifically configured to determine the first priority of the user equipment based on a type of control information that the user equipment needs to receive and according to the preset sorting rule of the control information type.

Optionally, the first priority of the user equipment is corresponding to a start reading time location of the available resource blocks of the user equipment.

The processor 1101 is specifically configured to: determine, according to the first priority of the user equipment, the start reading time location that is of the available resource blocks of the user equipment and that is corresponding to the first priority of the user equipment; and starting from the first resource block in the start reading time location, detect, according to the preset sorting sequence of the available resource blocks of the user equipment, the resource block allocated by the base station to the user equipment.

Optionally, the first priority of the user equipment is corresponding to a start reading resource block location of the available resource blocks of the user equipment at a target coverage level.

The processor 1101 is specifically configured to: determine, according to the first priority of the user equipment, the start reading resource block location that is of the available resource blocks of the user equipment and that is corresponding to the first priority of the user equipment; and starting from the start reading resource block location, detect, according to the preset sorting sequence of the available resource blocks of the user equipment, the resource block allocated by the base station to the user equipment.

Optionally, the processor 1101 is further specifically configured to: when detecting the resource block allocated by the base station to the user equipment, stop detection if the first priority of the user equipment is lower than a priority of a detected resource block or a resource block used to instruct to stop detection is successfully detected.

Optionally, the processor 1101 is further specifically configured to determine a second priority of the user equipment according to a preset second-priority sorting rule.

Optionally, when the preset first-priority sorting rule is a preset sorting rule of a random value output from a first random function, and input of the first random function includes identification information corresponding to the user equipment, the preset second-priority sorting rule is a preset sorting rule of a control information type; and the processor 1101 is specifically configured to determine the second priority of the user equipment according to the preset sorting rule of the control information type and according to a type of control information that the user equipment needs to receive.

Optionally, when the preset first-priority sorting rule is a preset sorting rule of a control information type, the preset second-priority sorting rule is a preset sorting rule of a random value output from a second random function, and input of the second random function includes characteristic information corresponding to the user equipment; and the processor 1101 is specifically configured to: calculate, according to the second random function and the characteristic information corresponding to the user equipment, a random value corresponding to the user equipment; and determine the second priority of the user equipment based on the random value corresponding to the user equipment and the preset sorting rule of the random value output from the second random function.

Optionally, the first priority of the user equipment is corresponding to a start reading time location of the available resource blocks of the user equipment, and the second priority of the user equipment is corresponding to a start reading resource block in the start reading time location.

The processor 1101 is specifically configured to: determine, according to the first priority of the user equipment, the start reading time location that is of the available resource blocks of the user equipment and that is corresponding to the first priority of the user equipment; determine, according to the second priority of the user equipment, a start reading resource block location that is in the start reading time location and that is corresponding to the second priority of the user equipment; and starting from the start reading resource block location in the start reading time location, detect, according to the preset sorting sequence of the available resource blocks of the user equipment, the resource block allocated by the base station to the user equipment.

Optionally, the processor 1101 is further configured to: when detecting the resource block allocated by the base station to the user equipment, stop detection if the second priority of the user equipment is lower than a second priority of a detected resource block or a resource block used to instruct to stop detection is successfully detected.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

The embodiments of the present invention further provide a computer storage medium. The computer storage medium may store a program, and when the program runs, at least some or all of the steps of the method in the foregoing method embodiments are performed.

In the foregoing embodiments, the description of each embodiment has respective focuses. For a part that is not described in detail in an embodiment, refer to related descriptions in other embodiments.

In the multiple embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes multiple instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A control information sending method, comprising:
    determining, by a base station, target control information and characteristic information corresponding to the target control information, wherein the target control information comprises information for scheduling user equipment by the base station, wherein the characteristic information corresponding to the target control information comprises a message type corresponding to the target control information, wherein the message type corresponding to the target control information comprises a random access channel (RACH) acknowledgement message of a target RACH request or a paging request message of the user equipment;
    learning, by the base station, of a coverage level of the user equipment by a random access channel (RACH) resource occupied by the user equipment in a random access process, wherein the coverage level is determined according to a measurement value of a signal sent by the base station;
    determining, by the base station according to the characteristic information from a resource block set corresponding to the coverage level, a target resource block subset corresponding to the target control information;
    selecting, by the base station and from the target resource block subset, an available resource block as a target resource block; and
    sending, by the base station, the target control information using the target resource block.

2. The method according to claim 1, wherein the characteristic information corresponding to the target control information further comprises identification information corresponding to the target control information.

3. The method according to claim 1, further comprising:
    learning, by the base station, of the coverage level of the user equipment by using a preamble resource or a preamble sequence sent from the user equipment in the random access process.

4. The method according to claim 2, wherein:
    if the target control information is corresponding to uplink data scheduling or downlink data scheduling that is performed by the base station for the user equipment, the identification information corresponding to the target control information is an identifier of the user equipment.

5. A control information detection method, comprising:
    notifying, by user equipment, a base station of a coverage level of the user equipment using a preamble sequence sent by the user equipment in a random access process or using a random access channel (RACH) resource occupied by the user equipment in the random access process, wherein the coverage level is determined according to a measurement value of a signal from the base station;
    determining, by the user equipment according to characteristic information corresponding to control information for scheduling the user equipment by the base station, a target resource block subset from a resource block set corresponding to the coverage level, wherein the characteristic information comprises a message type of a message to be received by the user equipment, wherein the message type comprises a random access channel (RACH) acknowledgement message of a target RACH request or a paging request message of the user equipment;
    detecting, by the user equipment, resource blocks in the target resource block subset for determining identification information in control information carried in each resource block in the target resource block subset;
    in response to determining that identification information in control information carried in a resource block in the target resource block subset is the same as identification information of the user equipment, determining, by the user equipment, that the resource block is a resource block scheduled by the base station for the user equipment; and
    reading, by the user equipment, the control information carried in the resource block.

6. The method according to claim 5, wherein:
    the characteristic information comprises the identification information corresponding to the user equipment.

7. The method according to claim 6, wherein the determining, by user equipment according to characteristic information, a target resource block subset from a resource block set corresponding to the coverage level comprises:
    obtaining, by the user equipment, a quantity X of time units that are readable for the user equipment; and
    determining, by the user equipment, multiple resource blocks in the X time units from the resource block set according to X random functions and based on the characteristic information to form the target resource block subset.

8. The method according to claim 5, further comprising:
determining, by the user equipment, the coverage level of the user equipment according to a measurement value of a signal from the base station.

9. The method according to claim 6, wherein:
if the user equipment waits for uplink data scheduling or downlink data scheduling by the base station, the identification information corresponding to the user equipment is the identification information of the user equipment.

10. A base station, comprising:
at least one processor;
a transmitter; and
a non-transitory computer-readable storage medium coupled to the at least one processor and storing programming instructions for execution by the at least one processor, the programming instructions instruct the at least one processor to:
   determine target control information and characteristic information corresponding to the target control information, wherein the target control information comprises information for scheduling user equipment by the base station, wherein the characteristic information corresponding to the target control information comprises a message type corresponding to the target control information, wherein the message type corresponding to the target control information comprises a random access channel (RACH) acknowledgement message of a target RACH request or a paging request message of the user equipment;
   learning of a coverage level of the user equipment by a random access channel (RACH) resource occupied by the user equipment in a random access process, wherein the coverage level is determined according to a measurement value of a signal sent by the base station;
   determine, according to the characteristic information from a resource block set corresponding to the coverage level, a target resource block subset corresponding to the target control information;
   select, from the target resource block subset, an available resource block as a target resource block; and
   send, using the transmitter, the target control information using the target resource block.

11. The base station according to claim 10, wherein the characteristic information corresponding to the target control information further comprises identification information corresponding to the target control information.

12. The base station according to claim 11, wherein:
if the target control information is corresponding to scheduling information of a random access channel (RACH) acknowledgement message from the base station in response to a target RACH request, the identification information corresponding to the target control information is a random number comprised in the target RACH request; or
if the target control information is corresponding to a paging request message from the base station to the user equipment, the identification information corresponding to the target control information is an identifier of the user equipment.

13. The base station according to claim 10, wherein the programming instructions instruct the at least one processor to:
learn of the coverage level of the user equipment by using a preamble resource or a preamble sequence sent from the user equipment in the random access process.

14. The base station according to claim 11, wherein:
if the target control information is corresponding to uplink data scheduling or downlink data scheduling that is performed by the base station for the user equipment, the identification information corresponding to the target control information is an identifier of the user equipment.

15. User equipment, comprising:
at least one processor; and
a non-transitory computer-readable storage medium coupled to the at least one processor and storing programming instructions for execution by the at least one processor, the programming instructions instruct the at least one processor to:
   notifying a base station of a coverage level of the user equipment using a preamble sequence sent by the user equipment in a random access process or using a random access channel (RACH) resource occupied by the user equipment in the random access process, wherein the coverage level is determined according to a measurement value of a signal from the base station;
   determine, according to characteristic information corresponding to control information for scheduling the user equipment by the base station, a target resource block subset from a resource block set corresponding to the coverage level, wherein the characteristic information comprises a message type of a message to be received by the user equipment, wherein the message type comprises a random access channel (RACH) acknowledgement message of a target RACH request or a paging request message of the user equipment;
   detect resource blocks in the target resource block subset for determining identification information in control information carried in each resource block in the target resource block sub set;
   in response to determining that identification information in control information carried in a resource block in the target resource block subset is the same as identification information of the user equipment, determine that the resource block is a resource block scheduled by the base station for the user equipment; and
   read the control information carried in the resource block.

16. The user equipment according to claim 15, wherein:
the characteristic information further comprises the identification information corresponding to the user equipment.

17. The user equipment according to claim 16, wherein:
if the user equipment sends a RACH request and waits for the base station to feed back a RACH acknowledgement message, the identification information corresponding to the user equipment is a random number comprised in the RACH request; or
if the user equipment waits to receive a paging request message, the identification information corresponding to the user equipment is the identification information of the user equipment.

18. The user equipment according to claim 15, wherein the programming instructions instruct the at least one processor to:

obtain a quantity X of time units that are readable for the user equipment; and separately determine multiple resource blocks in the X time units from the resource block set according to X random functions and based on the characteristic information to form the target resource block subset.

19. The user equipment according to claim 15, wherein the programming instructions instruct the at least one processor to:

determine the coverage level of the user equipment according to a measurement value of a signal from the base station.

20. The user equipment according to claim 16, wherein:

if the user equipment waits for uplink data scheduling or downlink data scheduling by the base station, the identification information corresponding to the user equipment is the identification information of the user equipment.

* * * * *